US009921289B2

(12) United States Patent
Russ et al.

(10) Patent No.: US 9,921,289 B2
(45) Date of Patent: Mar. 20, 2018

(54) TRACKING DEVICE COMPRISING A RECEIVING STRUCTURE WHICH CAN BE ADJUSTED ABOUT AT LEAST ONE AXIS, FOR MOUNTING AT LEAST ONE ELEMENT THAT IS SENSITIVE TO ELECTROMAGNETIC WAVES AND HAS A PREFERENTIAL RADIATION DIRECTION

(71) Applicant: IMO Holding GmbH, Gremsdorf (DE)

(72) Inventors: Erich Russ, Gremsdorf (DE);
Hubertus Frank, Höchstadt (DE);
Richard Nief, Baiersdorf (DE);
Konrad Büttel, Strullendof (DE)

(73) Assignee: IMO Holding GmbH, Gremsdorf (DE)

( * ) Notice: Subject to any disclaimer, the term of this patent is extended or adjusted under 35 U.S.C. 154(b) by 129 days.

(21) Appl. No.: 14/648,099

(22) PCT Filed: Dec. 6, 2012

(86) PCT No.: PCT/EP2012/005027
§ 371 (c)(1),
(2) Date: May 28, 2015

(87) PCT Pub. No.: WO2014/082653
PCT Pub. Date: Jun. 5, 2014

(65) Prior Publication Data
US 2015/0316639 A1    Nov. 5, 2015

(30) Foreign Application Priority Data

Nov. 28, 2012 (DE) .................. 10 2012 023 165

(51) Int. Cl.
F24J 2/38   (2014.01)
G01S 3/786  (2006.01)
(Continued)

(52) U.S. Cl.
CPC ............. *G01S 3/7861* (2013.01); *F24J 2/541* (2013.01); *F24J 2/542* (2013.01); *H02S 20/00* (2013.01);
(Continued)

(58) Field of Classification Search
CPC ...... F24J 2/38; F24J 2/54; H02S 20/32; H01L 31/052
(Continued)

(56) References Cited

U.S. PATENT DOCUMENTS

2008/0308091 A1* 12/2008 Corio ...................... H02S 20/32
126/606
2009/0229597 A1    9/2009 Choi et al.
(Continued)

FOREIGN PATENT DOCUMENTS

CN    201 269 283    7/2009
DE    294 39 44      5/1981
(Continued)

*Primary Examiner* — Kevin Pyo
(74) *Attorney, Agent, or Firm* — Pandiscio & Pandiscio

(57) ABSTRACT

The invention relates to a tracking device comprising a receiving structure that can be adjusted about at least one axis, for mounting at least one element that is sensitive to electromagnetic waves and has a preferential radiation direction, and comprising at least one rotational drive per axis for the purpose of actively rotationally adjusting said receiving structure in order for the element(s) mounted thereupon to track a celestial body on one or multiple axes with the aid of a control system and according to a predetermined algorithm, (each of) the rotational drive(s) comprising two annular connection elements that are concentric with one another, are mounted one upon the other, and are or can be coupled to at least one motor for mutual relative adjustment, a first connection element comprising at least one planar connection surface for fixing in place to a foundation, base, column or a connection element of another pivoting unit,
(Continued)

and a second connection element comprising at least one planar connection surface for the purpose of coupling to said receiving structure or to a connection element of another pivoting unit in a rotationally-fixed manner. In addition, at least one row of roller elements is provided between the concentric annular connection elements of a pivoting unit, said roller elements rolling along raceways on the first and second connection elements, a toothing being provided that extends at least partially around one connection element and is formed, together with the raceway(s) that are in place, by machining or shaping a shared annular main part, and bore holes distributed in a circle and passing through the planar contact surface being provided on the other connection element for the purpose of fixing to a contact part, and being formed together with the raceway(s) that are in place by machining or shaping a shared annular main part.

31 Claims, 21 Drawing Sheets

(51) Int. Cl.
*F24J 2/54* (2006.01)
*H02S 20/00* (2014.01)
*H02S 20/32* (2014.01)
*H02S 20/10* (2014.01)

(52) U.S. Cl.
CPC .............. *H02S 20/10* (2014.12); *H02S 20/32* (2014.12); *Y02E 10/47* (2013.01); *Y02E 10/50* (2013.01)

(58) Field of Classification Search
USPC .......... 250/203.1, 203.4; 126/572, 573, 577; 136/246
See application file for complete search history.

(56) References Cited

U.S. PATENT DOCUMENTS

2011/0023940 A1 2/2011 Do et al.
2014/0216522 A1* 8/2014 Au ...................... H01L 31/0522
136/246

FOREIGN PATENT DOCUMENTS

| DE | 10 2010 014087 | 10/2011 |
|----|----------------|---------|
| EP | 0 114 240 | 8/1984 |
| EP | 2 327 906 | 6/2011 |
| WO | WO 2009/147454 | 12/2009 |

* cited by examiner

Fig.1
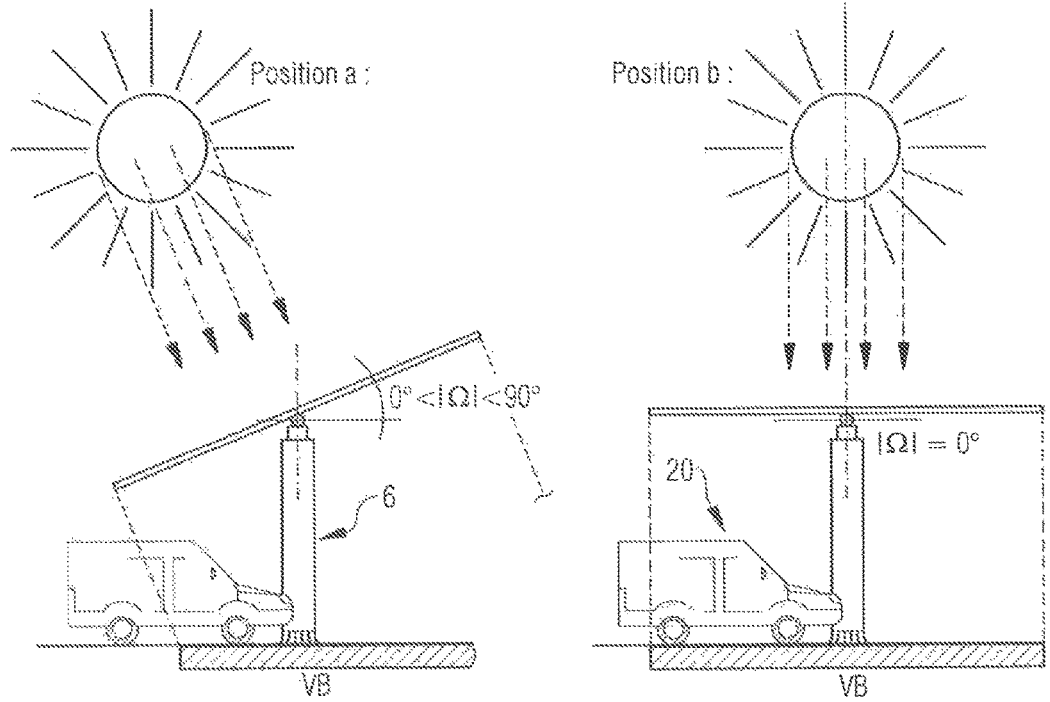
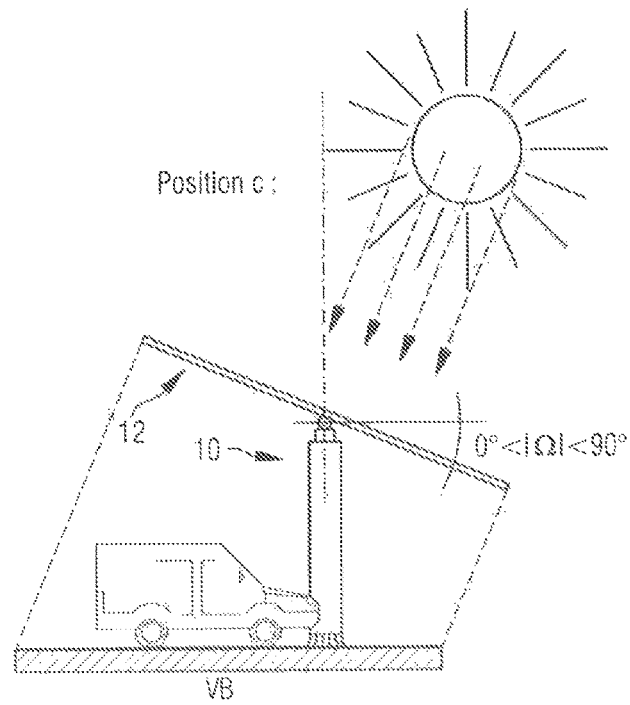

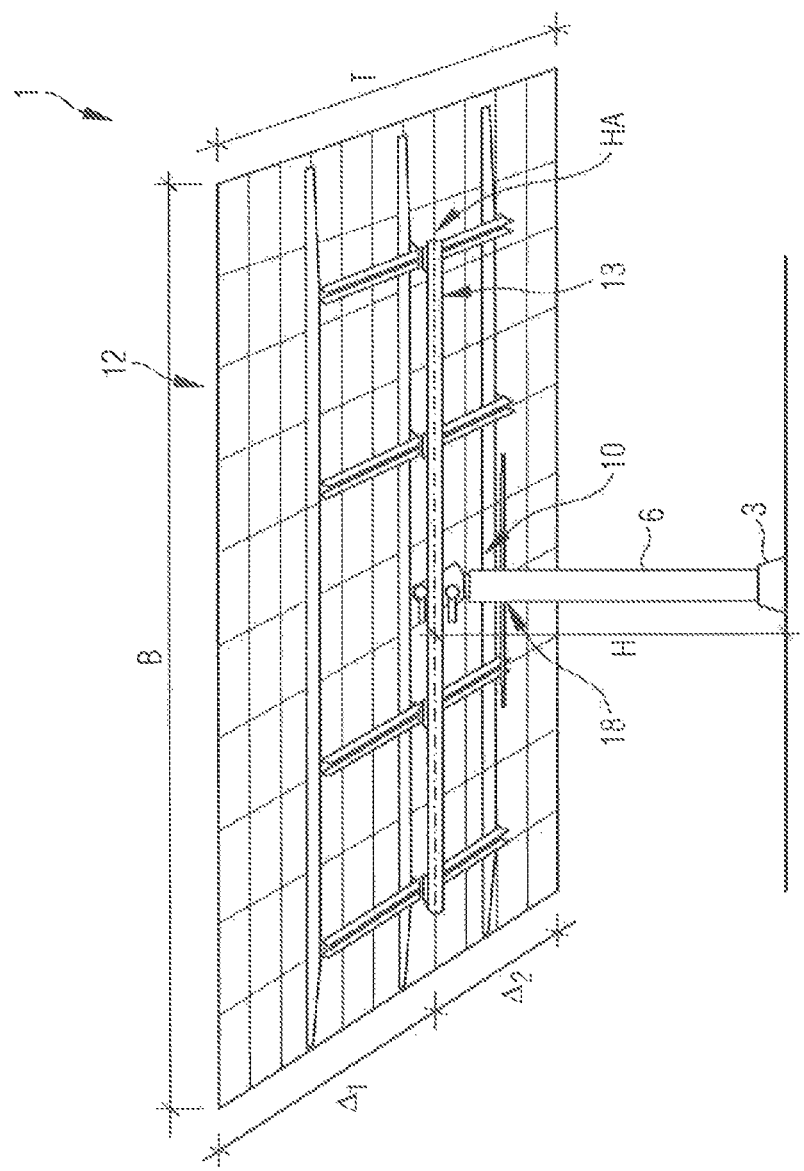

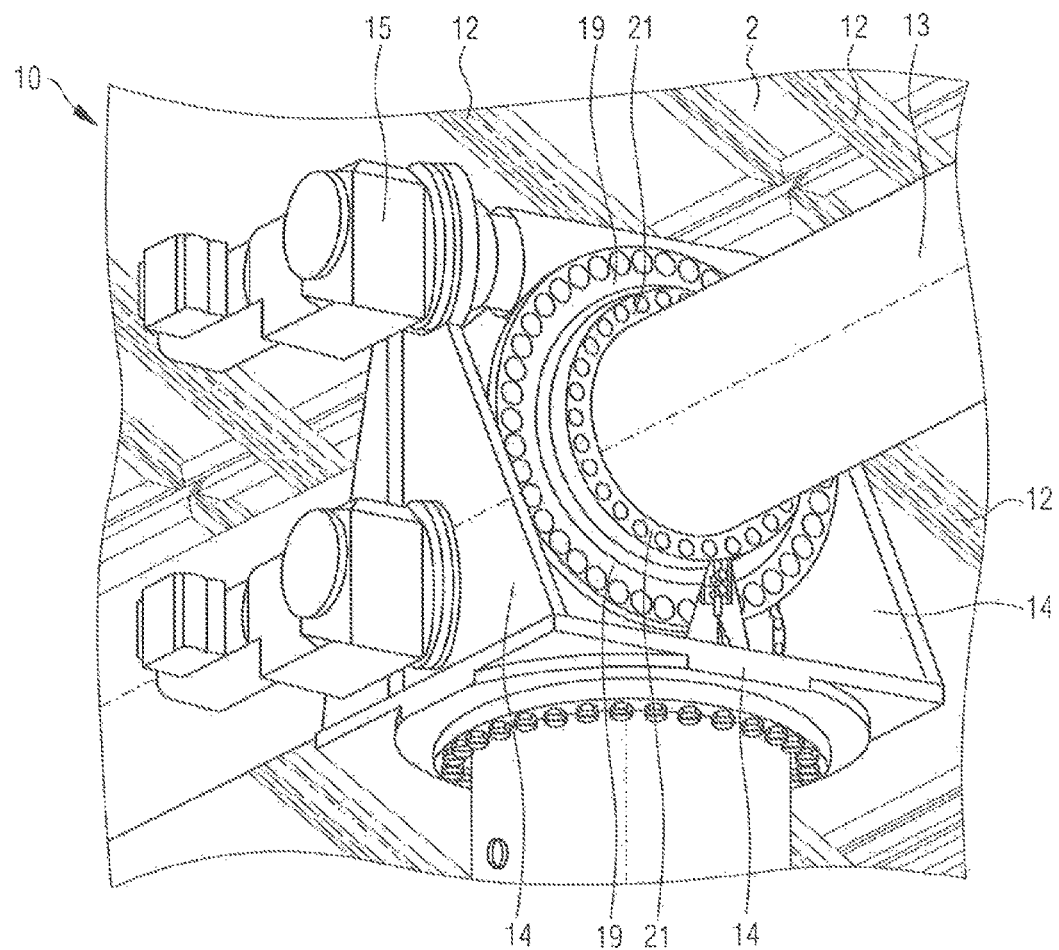

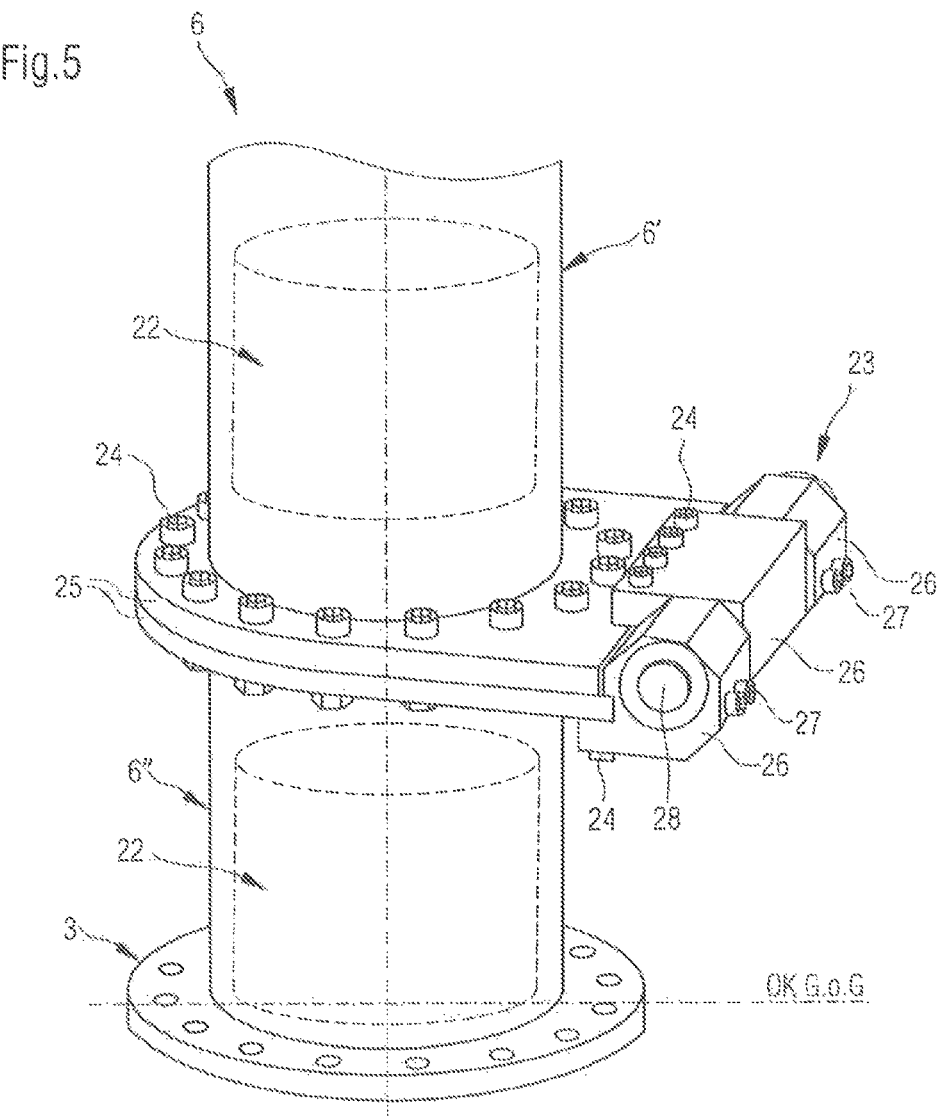

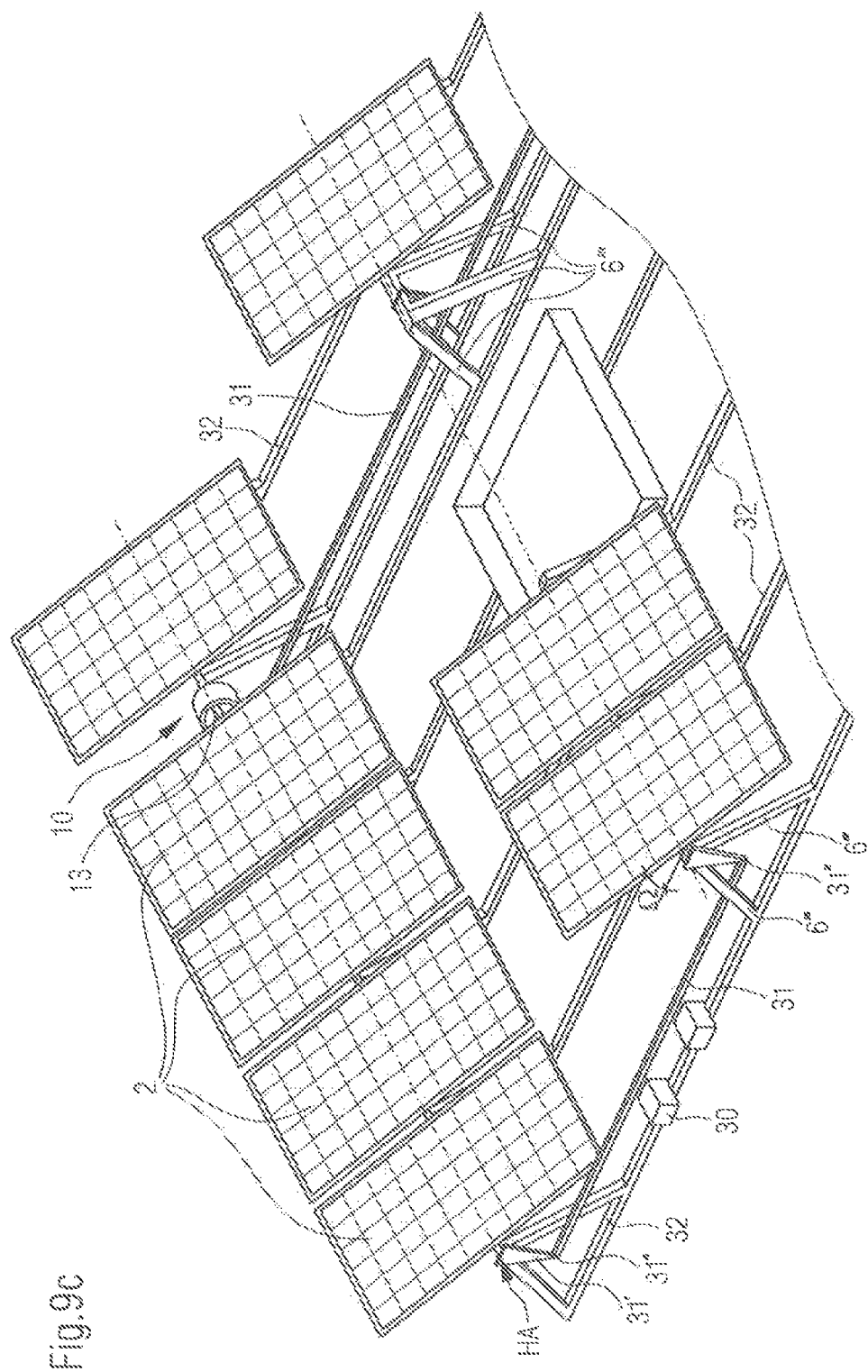

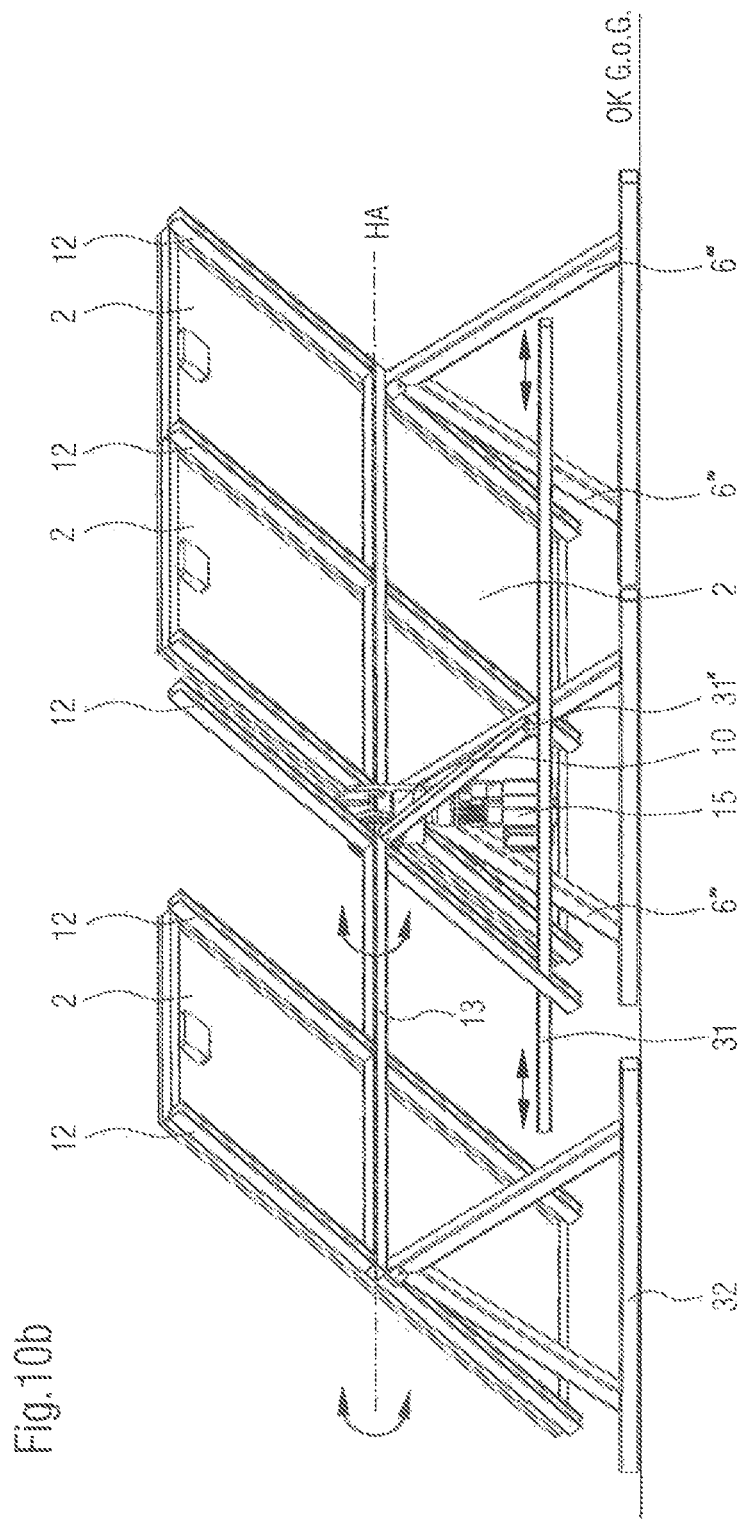

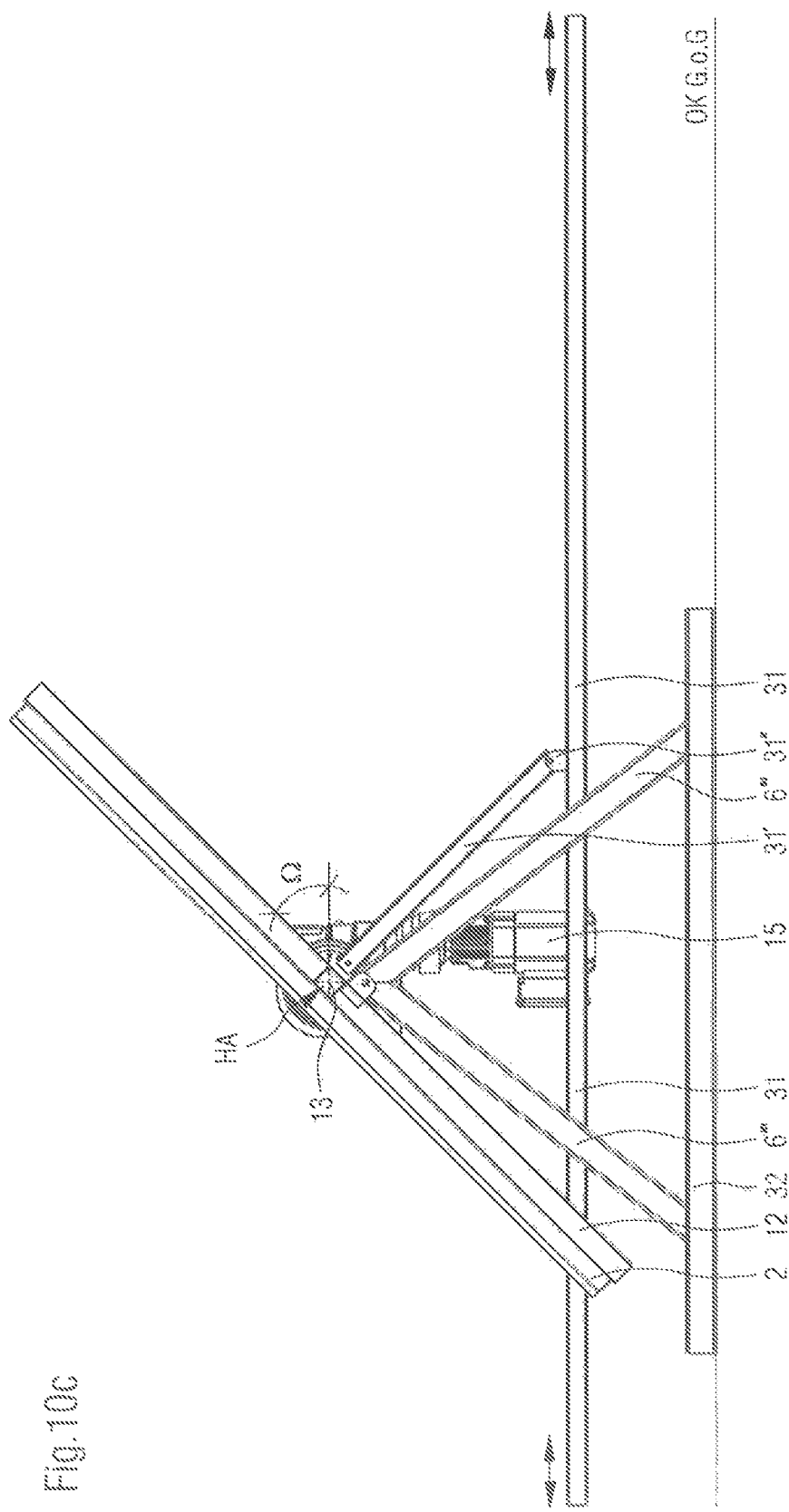

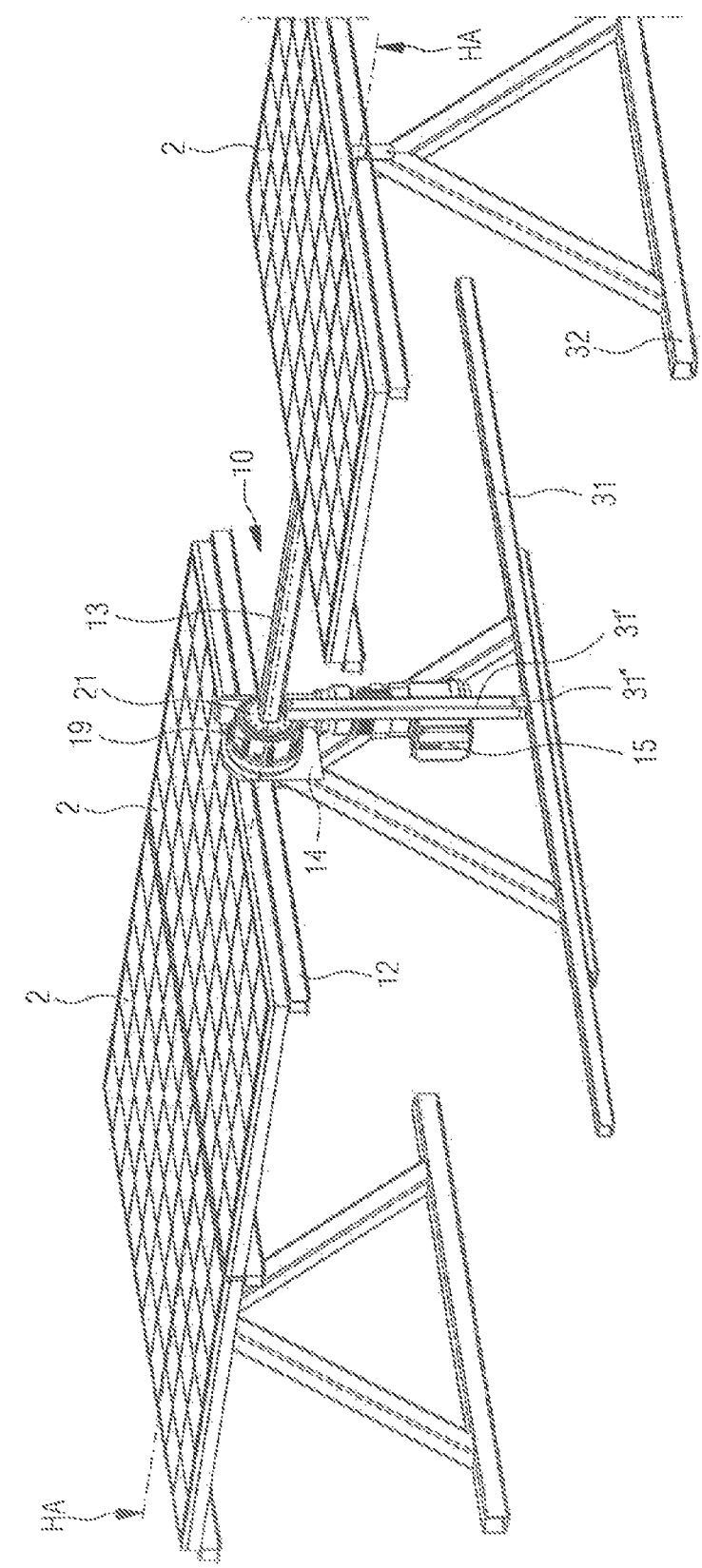

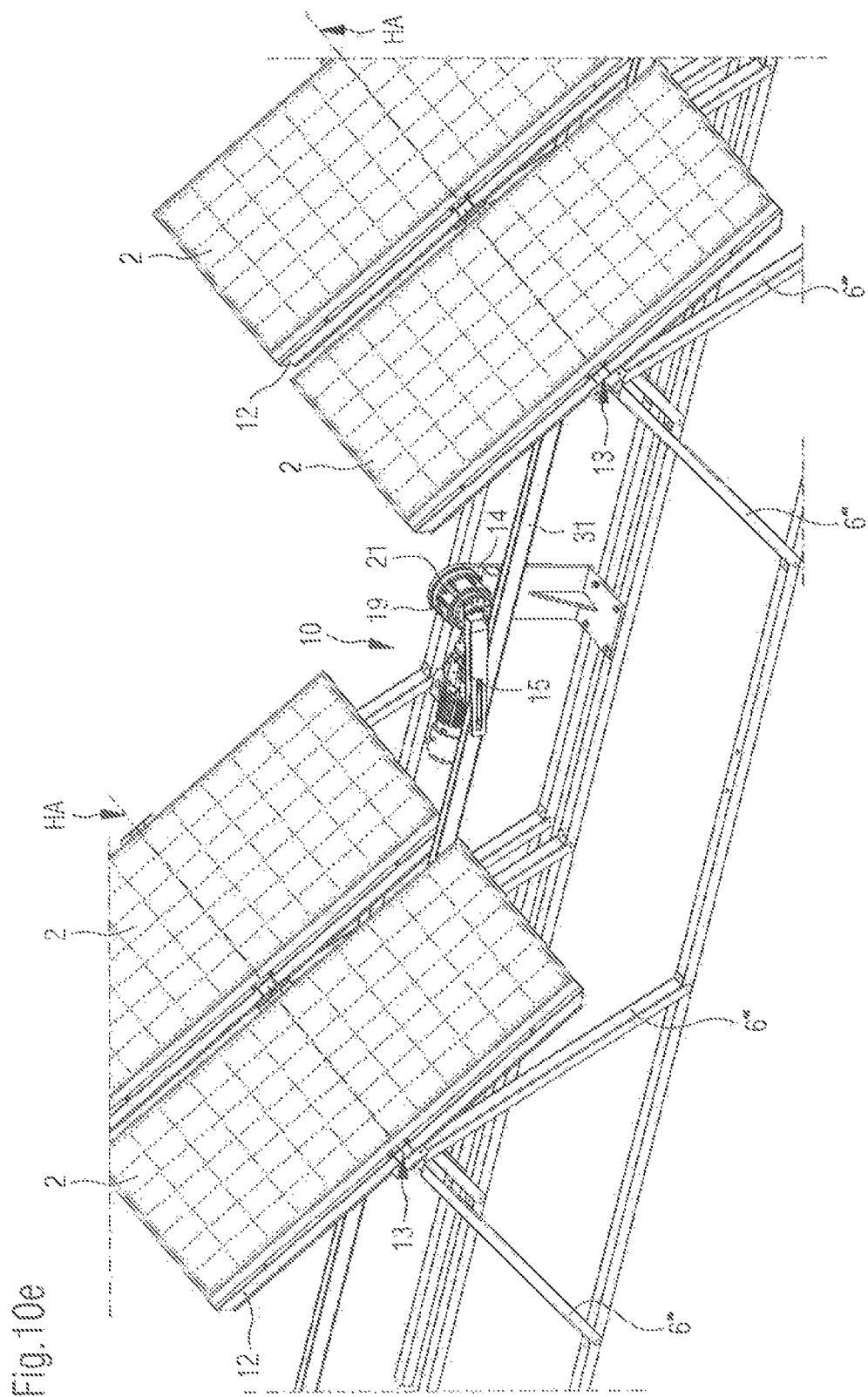

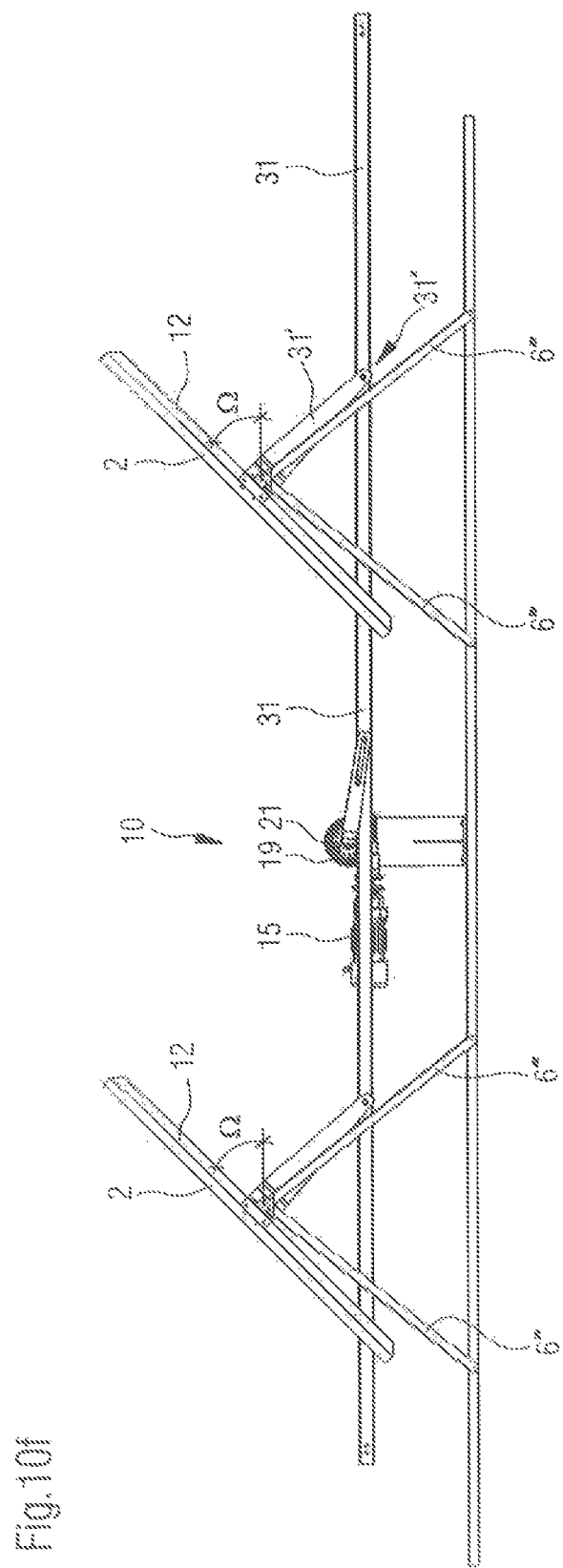

US 9,921,289 B2

TRACKING DEVICE COMPRISING A RECEIVING STRUCTURE WHICH CAN BE ADJUSTED ABOUT AT LEAST ONE AXIS, FOR MOUNTING AT LEAST ONE ELEMENT THAT IS SENSITIVE TO ELECTROMAGNETIC WAVES AND HAS A PREFERENTIAL RADIATION DIRECTION

REFERENCE TO PENDING PRIOR PATENT APPLICATIONS

This patent application claims benefit of International (PCT) Patent Application No. PCT/EP2012/005027, filed Dec. 6, 2012 by IMO Holding GmbH for TRACKING DEVICE COMPRISING A RECEIVING STRUCTURE WHICH CAN BE ADJUSTED ABOUT AT LEAST ONE AXIS, FOR MOUNTING AT LEAST ONE ELEMENT THAT IS SENSITIVE TO ELECTROMAGNETIC WAVES AND HAS A PREFERENTIAL RADIATION DIRECTION, which claims benefit of German Patent Application No. DE 10 2012 023 165.2, filed Nov. 28, 2012, which patent applications are hereby incorporated herein by reference.

FIELD OF THE INVENTION

The invention relates to a tracking device comprising at least one receiving structure which can be adjusted about at least one axis, for mounting at least one element that is sensitive to optical or other electromagnetic waves and has a preferential optical or radiation direction, such as a solar panel, solar reflector, telescope or the like, and comprising at least one rotational drive per axis for the purpose of actively rotationally adjusting the receiving structure in order for the element(s) mounted thereon to track a celestial body, particularly the sun, on one or more axes according to a predetermined algorithm with the aid of a control system, wherein (each of) the rotational drive(s) comprises a respective two mutually concentric, annular connection elements that are mounted one against the other and are or can be coupled to at least one motor to effect mutual relative adjustment, wherein a first connection element comprises at least one planar connection surface for stationary fixing to a foundation, base, upright or a connection element of another slewing unit, and wherein a second connection element comprises at least one planar connection surface for rotationally fixed coupling to the receiving structure or to a connection element of another slewing unit, wherein, further, provided between the mutually concentric, annular connection elements of one slewing unit is at least one row of rolling elements that roll along raceways on the first and second connection elements. The term "element that is sensitive to optical or other electromagnetic waves" should be understood hereinbelow to mean any device that captures optical or other electromagnetic waves and in a defined manner either converts them to another form of energy or focuses them (for example by means of lenses) or reflects them (by means of parabolic mirrors) or fixes them (for example on a film), i.e., inter alia, reflecting and refracting telescopes or even astro cameras, but particularly photovoltaic elements or solar mirrors. By the same token, since the conversion of captured energy will be of central importance in future energy supply and thus carries particular economic advantages, photovoltaics and solar thermics will be the main focus of attention below; astronomic applications, on the other hand—i.e., mounting and tracking as they relate to astronomical equipment—are of secondary importance.

BACKGROUND OF THE INVENTION

The stars are important to mankind from various perspectives: from them, astrophysicists can deduce not only the laws of celestial mechanics, but also the history and age of the universe.

In observing celestial bodies, it must be kept in mind that the optical telescopes, radiotelescopes or the like used for this purpose cannot remain constantly aimed at a given single point in the sky. Although the stars do remain relatively stationary in the heavens, the earth rotates on its axis once every 24 hours, thus causing every point in the sky to drift continuously across our celestial sphere. The mounting of an optical instrument must therefore be able to track continuously.

The sun is, naturally, particularly important among the celestial bodies, giving us life, light and warmth, and it thus will be used more extensively in the future to supply mankind with energy.

For several decades, technologists and engineers worldwide have devoted themselves to the design of systems by which the energy from the sun's rays can be captured and made technically usable. However, the technical exploitation of solar energy has only recently become efficient enough that it promises to be financially profitable, primarily because suitably efficient components are now available (especially in the field of photovoltaics) for absorbing and converting the energy transmitted by the electromagnetic waves in the form of light rays or solar rays.

Twenty years ago, the technology for harnessing solar radiation for use in converting heat into electrical energy basically consisted of suitably concentrating or focusing the best available reflectors and mirror apparatuses or parabolic arrays on certain points in order to focus and concentrate the energy there—usually at the focal point of such mirror apparatuses—for example by heating containers of media installed at a central location to cause evaporation, based on the principle of power generation by superheating steam followed by generator conversion; primarily over the past twenty years or so, however, the technology for harnessing solar radiation has shifted toward the use of solar panels, which have become increasingly efficient, especially in the form of flat solar collectors, also known as solar or photovoltaic modules (acronym: PV) or solar cells. Higher-performance crystalline PV modules or PV thin-film technology modules are the standard in use today.

An essential factor in the effort to harness solar radiation in an economically viable manner has always been optimal aiming of the support equipment for energy absorbing units (such as reflectors, mirror apparatuses, parabolic arrays, solar panels, solar cells, PV modules, etc.) according to the position of the sun, specifically so that the maximum yield of solar radiation strikes the energy absorbing unit. The solar energy absorbing or reflecting unit is often held in place by a support system, and in more advanced applications also tracks the position of the sun. Tracking systems for solar applications that are currently on the market and in use, which serve to orient devices for absorbing electromagnetic rays, especially solar rays, to a trajectory, are usually implemented as dual-axis, i.e., they permit tracking about two different axes, such that the surface of the modules concerned is always oriented tangentially to the sun and the rays from the sun thus strike the particular module perpendicularly.

For example, DE 294 39 44, published in 1981, describes a device for independently rotating an aggregate about two mutually perpendicular axes, in particular for tracking solar collectors, in which the drive shaft of a first, fixed drive mechanism, basically consisting of a housing, an electric motor, a multi-stage planetary gear set and a spur gear stage, carries at a free end the housing of a second, rotating drive mechanism that basically consists of the housing, an electric motor, a multi-stage planetary gear set and a spur gear stage, and the drive shaft of which, oriented perpendicularly to the drive shaft of the first drive mechanism, carries at its free ends the aggregate that is to be rotated.

Thus, whereas with dual-axis tracking systems the arrangement as a whole can be made to track at any time and even simultaneously in the vertical and horizontal directions (i.e., in elevation and azimuth), single-axis tracking systems allow tracking only in a single direction, i.e., electively either solely in an approximately vertical direction, also referred to as elevation, or only horizontally, also referred to as azimuthally; thus, according to the definitions prevailing in the current state of the art, a single-axis solar collector tracking in a horizontal direction, i.e., about a vertical axis, points due south at 0° azimuth, such that solar rays coming from the south strike the energy absorbing unit in an optimal manner; due east at −90°, due southeast at −45°, due southwest at +45° and due west at 90°, while the inclination to the vertical must remain unchanged in such a case, due to the lack of a second rotational or pivot axis.

At the same time, a single-axis tracking system already offers output advantages of up to 30% over a fixed southward-facing array, whereas with dual-axis tracking up to 45% more output can be achieved with an optimally designed system. Dual-axis tracking systems thus yield better outputs, but are more complex and thus higher in cost and more trouble-prone. In view of these interrelationships, the present invention favors the principle of single-axis tracking.

Such a principle is disclosed by the patent EP 0 114 240, granted in 2004; specifically, a single-axis linear tracking system for a solar collector array comprising at least one torsion tube oriented in a north-south direction and bearing a row of flat, rectangular solar collectors. A horizontal pushrod is able to move a plurality of rows of solar collectors.

Additional prior art that may be cited is the US patent document US 2011/0023940 A1, which describes a single-axis tracking collector system for solar energy. There, the rotational drive used is in fact a slewing unit, in which a rotating part is pivotably disposed inside a housing. Since the housing embraces the rotating part on an end face, it is not possible to fasten a support structure to said end face; this can be done only on one side, on the opposite end face. The resulting design is highly complex and has a relatively low load capacity, such that several extra bearing units are always necessary in addition to a rotational drive unit.

Briefly summarized, the prior art in general has the following disadvantages and characteristics:

1. Building-integrated solutions on carports or on buildings do not track and are usually fixedly integrated in the current state of the art. Non-tracking systems have disadvantages in terms of yield, however.

2. Roof-integrated solutions on buildings, particularly on flat roofs, are always connected to the building in the current state of the art, usually via a force fit, for example screwed or doweled or integrated via snap-together systems. The surface (skin) of the roof is usually manipulated as a result, most often penetrated or damaged in a controlled manner, if only for the deliberate placement of fasteners for the roof-integrated solutions. Since roofs are always exposed to environmental influences, deep installation holes, bores, screw connections, etc., must be sealed after the fact, or least installed in such a way that wind and weather will not damage the structure later on.

3. Dual-axis tracking systems are more expensive than single-axis tracking systems. At this point, dual-axis tracking systems exist only as free-standing systems. Moreover, tracking in elevation with these systems is always accomplished using highly specialized linear actuators.

4. Single-axis tracking systems generally have a limited tracking range, for example with regard to about an axis in an east-west direction.

5. All the commercially available systems to date have consistently been designed for one of the following areas of application: either for free-standing systems or for roof-integrated systems or for building-integrated installation. It is a tremendous disadvantage that no technology associated with the current systems lends itself to a fundamental arrangement that can be used in all the aforesaid fields of application.

From the disadvantages of the described prior art comes the problem initiating the invention: to avoid the disadvantages of the prior art so as to create an inexpensive system for tracking a celestial body that can be used not only as original equipment, but also as a retrofit system on existing floor space or open space or buildings.

SUMMARY OF THE INVENTION

This problem is solved by the fact that in a tracking device of the aforesaid species, provided on one connection element of a rotational drive is an at least partially circumferential toothing that is formed, together with the raceway(s) there, by machining or shaping a shared annular base body, the other connection element being provided with coronally distributed bores that pass through the planar contact surface and are intended to be fastened to a system part, and that are formed, together with the raceway(s) there, by machining or shaping a shared annular base body.

A support structure can be designed in the manner of a relatively large-area frame for simultaneously mounting a plurality of flat solar collectors adjacent to one another, such that only a single drive is necessary for their collective adjusting movement. The invention makes it possible to position such a support structure in the ideal case symmetrically over the inventive slewing unit, which is connected to the inventive slew drive on both sides of the latter. There may be no need to add additional bearings in such a case, because the static forces cancel each other out in any case, since the center of gravity of the support structure is then always approximately vertically above the slew drive. A number of advantages are gained in this case: On the one hand, an entire support structure holding a plurality of solar collectors can be mounted on a single slewing unit, thus eliminating the need for costly additional bearings. Furthermore, a support structure that is mounted at at least one central point can be relatively largely dimensioned and thus can support a proportionately large number of solar collectors. Finally, the substructure for the particular support structure can be given an ultra-lean design, ideally in the form of a single central column. This, in turn, affords the possibility of installing such a support structure on existing floor space or open space in such a way that the area under the support structure and next to the substructure can be put to other use, for example as a parking lot. By the same token, retrofit installation on buildings also may be possible even in cases where the available space is smaller than the lateral protrusion of the support structure.

Another option would be to arrange such a slewing unit between two adjacent support structures and control them simultaneously, thus further reducing the adjustment expenditure, since the number of slewing units needed is then only half the number of support structures. Each support structure can then be rotationally fixedly connected to a respective connection surface of the slewing unit according to the invention.

A further reduction of drive expenditure can be achieved by coupling-on additional support structures, for example via shared bearings between adjacent support structures, said bearings preferably then being located on the same main axis as the inventive slewing unit. The result, therefore, is a row of support structures that are all coupled to a single slewing unit and are all adjusted by it simultaneously, hence with minimal constructional expenditure.

If a plurality of such rows of support structures are to be adjusted on a single axis, then they can be coupled together, for example, via a linkage, if the length of such a linkage is approximately equal to the distance between two adjacent rows of support structures. In the ideal case, a plurality of such linkages can actually be used to couple a corresponding number of rows of support structures to the row with the slew drive, thus making it possible for an entire field, or at least a relatively large area of a solar field, to track on a single axis using only one slew drive. In this way, maximum energy yield can be obtained with the least possible constructional expenditure. There is also an additional side benefit, in that a worm drive offers comparatively high force multiplication combined with sharp rotation speed reduction, so high torques and forces can be generated with comparatively little drive power. Furthermore, in the ideal case a slew drive is self-locking, i.e., in the presence of a strong wind or a storm, the geometry of the worm gear prevents overrunning of the load and thus undesired adjustment of the support structures.

The open-center configuration of the connection rings according to the invention further makes it possible to run cables or the like centrally through them, and thus to consolidate the contacting of all the solar units mounted on one or more jointly adjusted support structure(s) and provide them with central lead-away.

The independence from the particular topographical situation that can be gained in this way is a novel feature. The aforesaid invention provides single-axis tracking in elevation, where the adjusting movement corresponding to the apparent motion of the targeted celestial body is not realized by means of linear actuators or drive elements, but rather with a motor-driven slewing unit that is optimized specifically for the requirements of adjustment about an elevation angle. This makes it possible to provide an arrangement that can be used in all three areas of application (as a freestanding system, for on-roof installation or integrated into the building). The system is of relatively simple or modular construction precisely in order to achieve virtually universal applicability.

It has proven favorable for the solar collectors or reflectors to be embodied as solar panels, photovoltaic modules, mirrors or the like. Whereas, according to the definition used here, solar collectors include both photovoltaic modules and hot water collectors, solar reflectors should be understood to encompass all kinds of mirrors, particularly of the kind encountered in larger solar thermal plants. The common goal of all these systems is to harness incident solar radiation for the production of energy while simultaneously allowing the area needed for this function to be at least partially usable for other purposes, or enabling it to actually exceed the existing usable mounting area, for example on a roof, tower, mast or the like. Thus, for example, existing parking lots, for instance in front of shopping centers, can be used for energy production, with the side benefit of reducing the intense heating of parked vehicles in the summer, preventing parked vehicles for example from being snowed in in the winter, and keeping rain and hail off parked vehicles during spring and autumn storms.

If, as the invention further provides, the main surfaces of all the solar collectors or solar reflectors mounted on a common support structure are implemented as planar and lie in a common, adjustable plane, then the area exposed to wind is reduced to the unavoidable minimum. At the same time, the support structure is simplified, as are its adjustment and control.

The invention can be developed further by connecting each of the connection surfaces of the second connection element to one or more support structures via a respective tube or linkage. Whereas the pivoting movement is transmitted in an axial direction via a tube coaxial with the main axis, a linkage serves to transmit the pivoting movement parallel to the main plane of the slewing unit, i.e., so to speak, in a radial direction.

If both connection surfaces have fastening bores passing perpendicularly through them, then, for example, tube flanges abutting them over a large area can be fixed to them, specifically, depending on the fit between the bolt diameters and bore diameters used, by means of a friction lock at the very least, or even a form lock in the case of a snug fit.

In a first embodiment, the fastening bores are configured as through-bores. In such a case, two tube flanges or connecting devices are always screwed on at the same time, there being one connecting device per connection surface. In this case, both connection tubes have to be attached and subsequently removed at the same time.

The situation is different if the fastening bores are configured as blind holes and are open alternately to both connection surfaces. The connection of one connection tube is then independent of the state of connection of the other and can thus be removed independently of the other, for example for assembly purposes.

In the last-described embodiment, the fastening bores are preferably provided with an internal thread to permit fixing without counter nuts.

The invention allows a plurality of support structures to be coupled together, preferably via a linkage or via the second connection element of the slewing unit, for the purpose of joint, synchronous pivoting movement. Because of the single-axis tracking, the directions of the main pivot axes of all the support structures always remain unchanged and, above all, coaxial with or parallel to one another, thus making mutual coupling relatively easy to achieve.

It has proven favorable for one of the two annular connection elements to have on one jacket surface a circumferential toothing for engaging the rotational drive.

This element is preferably an outer jacket surface that carries a circumferential toothing for toothed engagement with a worm gear. This toothing is preferably formed by machining the same annular base body as that of the planar connection surface, its raceway(s) for the (rows of) rolling elements and/or its fastening bores, thus achieving the greatest possible degree of precision.

The invention further provides that the rotational drive comprise at least one motor, whose rotor is rotationally fixedly coupled to or connected to a worm gear that meshes with the toothing of the outer connection element. Said motor can be a hydraulic motor or, preferably, an electric motor. Motors that can be precisely regulated have proven especially suitable, for example step motors or position-controlled servo motors.

The main plane of the slewing unit according to the invention is preferably vertically aligned. This main plane is oriented such that the main axis MA of the system part whose inclination can be adjusted passes perpendicularly through it, such that the slewing unit is mounted coaxially with said main axis MA and can serve not only as a drive for the tiltable system part, but also, simultaneously, as its mounting.

A toothing is preferably provided on the annular connection element comprising fastening means for connection to the system part whose inclination to the horizontal can be adjusted, particularly the support and/or receiving structure for solar collectors. Since this connection element has a respective planar connection surface on each end face, this preferably toothed connection element should not be embraced by the other connection element on any end face. For this reason, each connection element has only one surface, particularly a jacket surface, that faces the respective other connection element. Both the toothing of the toothed connection element and the rolling bearing(s) between the two connection elements are disposed in this jacket surface. In order for a worm gear to engage in the toothing, they should be located on an outer jacket surface; ideally, therefore, they are on the outer, convexly curved jacket surface, facing the gap, of the radially inwardly disposed connection element. The elements concerned—i.e., the toothing, on the one hand, and the raceway(s) for the rolling bearing(s), on the other—are preferably formed by chip-removing machining or shaping of the same jacket surface of a common connection element, preferably of the radially inwardly disposed connection element. The term "radially inwardly disposed connection element" should be understood in this context to mean the connection element whose connection surface penetrated by fastening means, particularly fastening bores, is located closer to the axis of rotation of the slewing unit than the connection surface of the other connection element. This, in turn, should be understood to mean that the fastening means, particularly fastening bores, of the toothed connection element for connection to the support structure or receiving structure that is adjustable relative to the horizontal are located radially inward of the toothing of the toothed connection element, while the fastening means, particularly fastening bores, of the non-toothed connection element for connection to a foundation or other, stationary substructure are located radially outward of the toothing. This can, in turn, be realized by having at least one driving worm gear disposed structurally between the two annular connection elements, i.e., radially outward of the inner connection element but radially inward of the outer connection element. To receive such a worm gear, the gap is widened in the area concerned, particularly in that the radially outer connection element recedes outward to create space for the worm gear. This results in a bulging of the outer connection element, which is preferably fixed in a stationary manner to the foundation or other subsurface or substructure, and the inner side of which does not extend rotationally symmetrically to the main axis of the slew drive.

If it were necessary for the toothed connection element to be embraced on an end face by the non-toothed connection element, then the non-toothed connection element should likewise be embraced on an end face by the toothed connection element. In other words, if the non-toothed connection element had a ring structure that was U-shaped in cross section, then this would also have to be true of the toothed connection element, and the two would have to be arranged one inside the other in such a way that each ring section of a connection element that represents a leg of the U was disposed inside the circumferential depression in the respective other connection element. The various sections of such a ring could also be produced separately from one another, and might not be joined rotationally fixedly to form a common connection element, for example by screw connection, until the slewing unit is assembled. An "annular connection element" in the sense of the invention thus need not necessarily be composed of a single part, but can also be made up of a plurality of parts that nevertheless ultimately form a rigid unit during operation.

Common to all the above-described embodiments is the fact that the mounting for the worm gear is located on the connection element that is to be fixed to a foundation or substructure, with the effect that the axis of the worm gear does not vary during operation. Thus, when the particular system is in the finished state, the worm gear does not pivot along with said system during an adjustment, but remains fixed in place and rotates solely about its own axis. The same applies to the drive motor, which is also fixed, for example flanged, to the positionally and rotationally fixed connection element or a gear set connected thereto. The gear set does not move during operation, but instead only its rotor turns, optionally on its longitudinal axis. This has various advantages. On the one hand, it simplifies the routing of supply and/or control lines, such as electrical cables or hydraulic lines, since they are not subjected to constant bending; on the other hand, there is no risk that such a motor might interfere with or contact or actually damage other components as it moves. What is more, a mounting or retaining structure connecting a slewing unit according to the invention to a substructure could be adapted to the protruding motor structure, for example by providing recesses or even penetrations at the relevant locations, for the motor to pass through.

If the radially inwardly disposed connection element is to be rotated and is provided for this purpose with a toothing on its outwardly disposed jacket surface, then the raceway(s) for the row(s) of rolling elements must be offset from the toothing in an axial direction (referred to the rotational axis of the slew drive or the main axis MA). In this case, both the rolling element raceways and the toothing are disposed on a common jacket surface of the radially inner connection element.

A further advantage of the invention is that the clearance of a rolling element with respect to the two end faces of the second connection element is greater than its clearance with respect to the relevant end faces of the first connection element. This measure can help facilitate the introduction of the rolling elements, particularly through a fill opening on the first or outer connection element. In such a case, the rolling elements can be replaced successively as needed, optionally even without dismantling the assembly as a whole.

Further advantages are gained if the toothing of the outer ring is embraced by a housing. The ingress of dirt particles and thus damage to the toothing can be prevented in this way.

If the housing and/or the gap between the two connection elements is sealed and filled with a lubricant, particularly with lubricating grease, nearly wear-free operation and thus maximal service life can be obtained.

By virtue of the single-axis arrangement, the longitudinal direction of the main axis is defined in a horizontal orientation, thus creating very simple geometrical relationships. The main axis can be defined in either an east-west or a north-south direction. Whereas in the former case the orientation of the radiation-sensitive surface can be adapted in particular to the variation of the seasonal solar zenith angle, with an arrangement according to the latter variant this surface is primarily able to track the apparent daily course of the sun.

The invention further provides that the first connection element is anchored to a stationary and immovably fixed mounting, particularly a fastening plate, by means of a multiplicity of mounting screws distributed coronally about the main axis and disposed parallel to the main axis, the center angle between adjacent mounting screws being equal to or less than 60°, preferably equal to or less than 45°, particularly equal to or less than 30°, in the ideal case even equal to or less than 15°. This results in comparatively small distances between adjacent mounting screws, thus creating a connection with an extremely high load capacity.

The mounting plate should be oriented vertically and should be intersected perpendicularly by the stationary main axis, so that no tipping movements of any kind are superimposed on the rotating or pivoting movement.

For mounting on a foundation, chassis, frame, stand, tripod, pylon or column, the mounting plate can be connected to at least one bottom-side fastening element. For reasons of statics or equilibrium, this fastening element should be disposed vertically under the mounting plate.

The invention can be developed further in that the fastening element has at least one planar, horizontal bottom side, for example at least one horizontal fastening plate or fastening rail. The weight force of the load-applying structure is conducted areally there into the foundation or other substructure.

It is also characteristic of the invention that the mounting plate is connected to at least one fastening plate or fastening rail by one or preferably two or more connecting and/or stiffening elements, each having at least one edge that extends slantingly backward from the mounting plate to the fastening plate or fastening rail. This resulting structure widens from the top edge or the top region of the vertical mounting plate to the bottom-side fastening plate or fastening rail, similar to a triangle standing on its base with the apex pointing up. Such an arrangement is extremely stable, in particular rigid to bending.

It is further within the teaching of the invention that a slewing unit and/or bearing carrying the support structure has a clearance with respect to the surface underneath it that is equal to or greater than half the extent of a support structure transversely to the main axis thereof, such that there is still room left beneath it for other uses, particularly as a parking lot. Depending on the type of use, the clearance should exceed half the extent of the support structure transversely to its main axis by an amount equal to the maximum height needed for said use. For example, if the underlying area is to be used as a parking lot for passenger vehicles, said amount should be approximately 2.5 m, so that even when the support structure is set at its steepest angle, there will still be sufficient space for passenger vehicles, possibly carrying roof-mounted luggage racks.

The invention additionally comprises an adjustable system with at least one support structure that is adjustable on a single axis about a horizontal main axis and that is provided, for example, to receive one or more solar panels or photovoltaic modules in order to change their elevation angles, including or comprising at least one rotational drive that is operative to actively rotationally adjust the support structure about the horizontal main axis and is configured as a slewing unit with two mutually concentric rings, which are mounted one against the other and are or can be coupled to at least one motor or drive for mutual relative adjustment, wherein a first one of said rings serves to effect stationary fixing to a foundation, upright or the like and a second one of said rings has two connection surfaces that are disposed on mutually opposite end faces and are offset in parallel from the first one of said rings in an axial direction, particularly along the main axis.

The description that follows relates in particular to exemplary embodiments of the invention that employ a rack (receiving structure) fitted with planar elements or surfaces and able to pivot in an elevation direction by being coupled to a support structure that is set in rotation by a slew drive. A distinction should be made here between two essential forms of the invention which nevertheless are based on the same principles recited above and thus can be implemented using the same, modular basic elements:

The first form will be termed "lightweight structure" below and provides for the use of the just-cited basic elements in a system carried by a very lightweight rack, usually made from light metal or aluminum or being of similar lightweight design. This rack forms the substructure and is often implemented as a truss-like support structure. Mounted on this lightweight frame and raised by said lightweight frame to a usually relatively low height H is a slewing unit that is responsible for rotating at least one support structure about a main axis to effect movement in elevation.

The second form, which will be termed "massive structure" below, provides for the use of the aforesaid basic elements in a system that is carried by at least one pipe or a massive column or pillar, usually a pylon of steel, steel-reinforced concrete, tubular cast steel or a similar massive form. This column or pylon, which is fashioned inwardly either as a hollow body (pipe) or as solid material, forms the substructure and can be disposed either centrally or eccentrically under the receiving structure to be supported. Mounted on said column/pillar and raised by it to a moderate to large height H is at least one slewing unit that causes a support structure to rotate about a main axis in order to effect movement in elevation. With this form, for example only one column, pipe-shaped pillar or pylon is needed for a weight-bearing receiving structure designed to support a total area on the order of up to 400 $m^2$ (defined by the area $A=W \cdot D$, assuming a width W and a depth D). A general principle is that the more massive the pillar, the more mass can be supported by the receiving structure as is, without the latter being difficult to stabilize and without compromising the pivotability of the receiving structure and of the elements or modules fastened to it.

A first advantage of the invention, realized for example with the lightweight structure, is as follows. In the current state of the art, building- or roof-integrated solutions installed on buildings, particularly on flat roofs, are always connected to the building, usually via a force fit, for example screwed or doweled or integrated via snap-together systems. By means of the invention, such building- or roof-integrated system solutions can be positioned with sufficient stability under their own weight, with additional ballasting if necessary. Thus, there is no longer any need to plant deep installations in the surface of the roof, for instance to make bores for screws, since a plurality of planar elements (solar panels or PV modules) can be suitably positioned side by side and especially one behind the other by means of easily mountable foot rails and ballasted with weights. Examples of elements that can be added as weight are (cast) concrete blocks, or alternatively sandbags, or molded metal bodies, which can be laid over the foot rails of the substructure in such a way that the foot rails are held in position via a form-fit and are thereby secured so that they cannot slip out of place. The arrangement will be self-supporting by virtue of its own weight and suitable adjustment to wind loads. A system is therefore provided which, due to the minimally invasive type of installation, is very unlikely over the long term to occasion any subsequent structural damage of the kind that might be anticipated, for example, due to the gradual seepage of moisture into the structure.

Moreover, existing open spaces, such as parking lots, meadows and fields, open spaces in front of businesses and supermarkets, etc., can be retrofitted with the invention. The columns, pylons, pillars or the like can be placed in the existing open spaces or median strips. Consequently, there is no appreciable loss of space from usable areas, or such losses are at least kept to a minimum, since—for example in parking lots—areas always exist that are not blacktopped or paved from the beginning, for example in order to leave room between adjacent rows of parking spaces; the columns, pylons, pillars can be set up in precisely these unblacktopped or unpaved open spaces or median strips.

The receiving structure supporting the system can be mounted on a squarely centered and centrally arranged substructure, the horizontal distance $\Delta$ between the center of the receiving structure or its center of gravity and a—for example—columnar substructure then being approximately equal to zero: $\Delta=0$. If the substructure is offset from the center of gravity of the receiving structure by a distance $\Delta\neq0$, although some asymmetry may result from this arrangement, it can nevertheless be kept within limits or compensated for with counterweights. This adaptable usability of the existing available space is a tremendous advantage in practice, since existing areas can be retrofitted satisfactorily and still continue in their original purpose to the greatest possible extent.

In the context of multifunctional use, the system equipped with the invention can offer protection against wind and weather. In the summer, for example if the systems are erected in an open space near a supermarket, such as in a vehicle parking lot, the projecting flat solar modules can offer sun protection to vehicles parked underneath. Since the projecting flat solar modules are always positioned as ideally as possible, within the limits of their adjustment, to absorb/receive the maximum amount of solar energy, there is always a large shadow area (SA) on the ground, for example on the or by the top edge (TE) of the landscape or building. Vehicles or other equipment parked, stored or stopped in this shadow area are protected against intense warming/heating by solar energy. In fall and winter, vehicles parked under the projecting flat solar modules are always protected better against wind and weather, especially against precipitation, rain, snow, showers, than vehicles parked completely out in the open.

When the system equipped with the invention is used on farmland, because no complete shading of the sun occurs, intense solar radiation is allowed to pass through only to some extent. Crops can be grown under the solar tracker according to the invention. In fact, particularly when the system equipped with the invention is used in arid or near-desert regions, it often makes agriculture possible there for the first time by keeping the heat of the sun off the plants and thus reducing the evaporation of water.

Parts, especially non-moving parts of the substructure of the system equipped with the invention, can be multipurposed, for instance used as substrates for information or advertising, for example when the system is installed along roadways or near supermarkets, or as mountings for a lighting system. This has advantages, for example, along paths or roads or in parking lots that are to be lit at night. In this case there is no need to purchase expensive lamps such as curved mast lights or the like, since the lighting equipment is mounted directly on the substructure, for example in the bottom datum plane between the TE of the building or landscape to H.

The energy yield of the system equipped with the invention is maximized, since the tracking region is much larger with the use of a slew drive to track in elevation than it is with the use of a linear actuator and drive element to reproduce the elevation movement. The elevation angle $\Omega$ that can be set by means of the inventive arrangement can theoretically assume any arbitrary value between 0° and 360°. In practice, however, this angle is actually limited solely by the spatial requirements of the substructure. Hence, in practice this value is equal in amount to between $0°\leq|\Omega|\leq 90°$ and in absolute terms to between $-90°\leq|\Omega|+90°$, and is therefore greater than with the use of a linear actuator and drive element to perform the elevation movement.

At night, for reasons of optimal weight distribution and to conserve position-maintaining energy, the mounted solar array is usually in the so-called tabletop position, with the solar surface oriented horizontally. An elevation angle $\Omega$ measured from the horizontal plane is then exactly equal to 0°. The same tabletop position is assumed for reasons of safety in stormy weather, i.e., when wind forces pushing against the solar surface over a large area exceed a given threshold value. This tabletop position is in the nature of a (default) basic setting of the mounted solar array, which the control unit of the solar array always preselects in the absence of any exactly defined control signals for single-axis tracking of the position of the sun.

This tabletop position is also reached in the daytime when the sun is at its zenith and the solar radiation strikes the solar panels directly (orthogonally). In this case, as well, the elevation angle $\Omega$ measured from the horizontal plane outward is exactly 0°.

The security of the system against vandalism is increased, since the moved or movable elements for effecting the elevation movement are compactly housed and there is no need for any of the more space-consuming elongated rods or struts that are always present with linear actuators. The compact and space-saving construction of the slew drive, in contrast to the projecting and exposed design of linear actuators, is less vulnerable to passenger traffic, freight traffic, etc. If the invention is used, for example, in the form of the so-called massive structure on a parking lot, there is consequently no risk that parking or moving vehicles or trucks will come into contact with exposed parts of the system equipped with the invention and thereby jeopardize the functionality of the system per se.

A further advantage, which is realized for example with the massive structure, is that the substructure is implemented as one-piece, or, alternatively, as a multi-part object whose individual parts are then joined together by form-fit or force-fit connection. Non-separable connection, in the sense of soldering or welding, is also possible. If the substructure is implemented in the form of a pillar, column or pylon, then the latter can be composed of a plurality of individual parts, an upper part of the pylon being implemented so that it can be tilted over on a hinge relative to the bottom part of the pylon. The advantage that results is the simplified manner of installation: individual parts can be transported more easily and separately to the site where the system is to be installed and assembled there. In addition, no heavy installation equipment such as a mobile crane is needed to set up the pylon or the system as a whole, since the bottom part of the pylon can be secured by anchoring it in the ground, and thus suitable equipment such as a block and tackle is all that is needed to accomplish the folding about the hinge in the pylon. This saves time and money in practice.

According to the invention, just a few (minimum: one solar panel or PV module) to very many (example: up to around one hundred or even more of said individual solar panels or PV modules) solar collectors can be adjusted in an elevation direction by means of only one slewing unit. The connection of the individual support structures in the axial direction is effected by means of rotationally or torsionally fixed tubes extending coaxially with or parallel to the support structures, and in the direction perpendicular thereto by means of horizontally oriented pushrods, each of which is linked to a respective hinge on the support structures to be pivoted, such that the pivoting movement of all the individual solar panels or PV modules is accomplished by the motorized actuation of a slew drive that is usually disposed approximately at the geometric center of the field of solar panels.

A pylon or column can be implemented with either a round or a polygonal cross section, since the cross-sectional shape of the pylon or column usually is not essential to the effect of the invention.

Additional advantages are obtained when the inventive system is installed on buildings, particularly on building roofs. Such locations may receive a few solar panels for collecting solar energy or entire fields of solar panels composed of a plurality of solar panels or PV modules oriented in the same direction.

An additional advantage becomes obvious with the use of a system according to the invention to retrofit sufficiently stable roofs, for example flat roofs or flat building surfaces, which normally, according to the prior art, would be fitted with permanently installed solar arrays. The lightweight structure particularly lends itself to this application, provided that the height H is chosen as sufficiently high; however, use of the massive structure is not out of the question, in principle, as long as the load-bearing capacity of the building is sufficient. The existing open space on the roof can be used in this manner in a plurality of, at least two, datum planes. In the first plane, approximately at the height between the TE of the building or landscape to H, this being the surface of the shadow area SA of the system, conventional building facilities such as building technical services, shelters, storage areas, etc., can be constructed. The second plane is used for the harnessing of solar energy by means of the system equipped with the invention. This type of simultaneous multipurpose space utilization increases overall space efficiency and helps save on costs, for example since existing areas are used more efficiently.

The control pulses to the single-axis adjusting device for effecting elevation movement, i.e., the rotation of a support structure about a main axis, are generated by a separate control device, particularly an electronic control device.

The system equipped with the invention can be used as a solar fueling station for electric vehicles if means are present for coupling the electric vehicle to the load-bearing elements of the system as a whole, for example to the substructure, in order to establish an electrical connection to a load, for example an electric motor driven vehicle. This is particularly advantageous if the solar array according to the invention is located in a parking lot, for example in front of a supermarket. The electric vehicles being used for shopping trips, for example, can then be recharged immediately for the return trip home, especially if the coupling means has a quick charge functionality.

In addition, at least one energy store containing cells or modules for (intermediate) storage of the energy collected via the solar panels can be mounted or housed near the base or floor of the system equipped with the invention. This energy store can comprise accumulators or rechargeable battery cells, but also any other conceivable such cells or modules for electrical or chemical energy storage. Such cells or modules are located in reserved areas, so-called chambers, in the column or pylon of the system equipped with the invention, particularly in the substructure of a support structure; they can also be disposed in an area near the ground or in the ground itself, underneath the system equipped with the invention, or in a nearby building.

Such an energy store affords the possibility of being able to retrieve the stored energy during periods when there is no sunshine, i.e., for example at night.

A measure according to which a mounting assembly shared by two slewing units is configured such that the two pivot axes extend neither parallel to each other nor perpendicular to each other has the effect that the two slewing units, each of which is arranged rotationally symmetrically to a pivot axis, need not be disposed perpendicularly to each other, with the result that the connectors of a mounting assembly connecting them to each other can have a certain symmetry-like structure. Such a mounting assembly can thus be produced in a much simpler and consequently more inexpensive manner. Annular pivot bearings are often referred to as open-center and thus optionally allow cables to be passed through them or drive motors to be integrated into the inner space.

It has proven favorable for the shared mounting assembly to be configured such that at least one annular structure of at least one slewing unit embraces both pivot axes with a clearance on all sides. Whereas the pivot axis belonging to this slewing unit runs coaxially through it, the other pivot axis is not coaxial with the annular slewing unit, although it does pass all the way through it; consequently, this slewing unit is located approximately concentrically above the other slewing unit and thus is also supported roughly at its center of gravity.

It is within the scope of the invention that the two pivot axes intersect, preferably in the region of the shared mounting assembly, particularly within a connection part thereof. A common intersection point creates a maximum degree of structural symmetry and is therefore desirable for reasons of statics.

If the device as a whole for multi-axis adjustment of a system part is considered as a series connection of two slewing units via a plurality of connecting components, the result is a structure made up of various sections, each of which is approximately parallel to a respective section of a pivot axis. The pivot axis sections extending along said sections form at their intersection point an angle of inclination $\alpha$ which is preferably an obtuse angle, i.e., $\alpha > 90°$.

The thereto-complementary angle of intersection $\beta$ between two legs, which can be projected toward each other, of the two, optionally prolonged pivot axes should be equal to 15° or more, preferably equal to 30° or more, particularly equal to 45° or more.

By the same token, the invention recommends that the complementary angle of intersection β between two legs, which can be projected toward each other, of the two optionally prolonged pivot axes be 75° or less, preferably equal to 60° or less, particularly equal to 45° or less.

Furthermore, the shared mounting assembly should have one or preferably two flat, in particular planar, connection part(s). These connection parts serve to effect connection to the preferably also planar connection surfaces of the annular slewing units.

The invention recommends that the connection of a flat connection part to one or preferably two slew drives be by form-fit or force-fit, particularly by screw connection. An alternative is, for example, welding.

The shared mounting assembly itself preferably consists of metal; it can in particular be cast from metal or welded together from a plurality of metal parts. Metal construction provides sufficient stability. It is suitable both for production in a casting process and for assembly from individual parts.

If the shared mounting assembly comprises at least one elongated profile having an at least locally constant cross section, particularly a rectilinearly extending, elongated profile having an at least locally constant cross section, production can be further simplified by the use of a prefabricated profile having a suitable cross section.

A particularly compact embodiment is characterized by the fact that the shared mounting assembly includes at least one simply-connected profile, for example a flat bar, angle iron, T-bar, a profile with a top and a bottom flange and a center web, or the like.

In another case, the shared mounting assembly includes at least one hollow profile, for example at least one straight tube, preferably at least one straight cylindrical tube, particularly at least one straight circular-cylindrical tube. Such a double-connected profile generally has higher stability than a merely simply-connected profile, and thus also a higher load-bearing capacity.

The invention provides that one or preferably both end faces of the profile each lie in one plane. The profile thus is ready for connection to a planar connection surface of a slewing unit. If necessary, said connection could be made directly by welding.

A plane within which one end face of the profile lies is preferably intersected perpendicularly by the longitudinal axis of the tube. In the case of a profile in the shape of a circular cylinder jacket, the particular end face thus follows a circle line.

Alternatively, a plane within which one end face of the profile lies is not intended to be intersected perpendicularly by the longitudinal axis of the tube. This has the consequence that in the case of a circular cylinder jacket shaped profile, the particular end face follows an ellipse, corresponding to an oblique cylinder section. In an ellipse, the radius is not constant, but varies between a maximum value in the case of the large semiaxis a and a minimum value in the case of the small semiaxis b: $a \geq r \geq b$.

If a respective fastening plate is fixed to one or preferably each of the two end faces of the profile, particularly in flush abutment with the particular end face, then connection to the slewing unit that is to be connected is further simplified. Such a fastening plate preferably has a circular outer circumference, corresponding to the circular-annulus geometry of conventional slewing units. The radius of the outer circumference is, in any case, equal to or greater than the maximum radius of the particular end face of the connection part. If there is an inner opening in the fastening plate, for example for cables to be led through or to receive components, then such an opening preferably also has a circular inner circumference with a radius that is equal to or smaller than the minimum radius of the particular end face of the connection part.

A further option for using a mounting assembly to connect two slewing units whose pivot axes are inclined in relation to each other is to provide each of the fastening plates that are to be connected to the two slewing units with a respective, preferably circular cylinder jacket shaped tube socket and then to connect them to each other. This has the advantage that the end faces, each adjacent to a respective fastening plate, can trace a circular path if each fastening plate is intersected perpendicularly by the longitudinal axis of the respective tube socket.

The two tube sockets can be connected to each other by juxtaposing their two free end faces, if their planes are each intersected at the same angle by the respective pivot axis. The end faces to be juxtaposed then each follow an ellipse having in each case the same large semiaxis a and in each case the same small semiaxis b. The two end faces then need only be welded together. On the other hand, it would also be conceivable to weld a respective plate with edges that protrude in a flange-like manner onto each of the two abutting end faces and then to screw these flanges together. This has the advantage that the mounting assembly can be taken apart at this location, for example in order to replace an assembly.

Alternatively, the two tube sockets of a mounting assembly, each of which extends concentrically with a respective pivot axis, can also be connected to each other by having the curved jacket of one tube socket—preferably of the tube socket directly supporting the upper slewing unit—rest on a correspondingly three-dimensionally curved end face of the other tube socket—preferably of the lower tube socket—and be connected thereto, for example welded thereto. Although the three-dimensionally curved end face follows a saddle-shaped curve, this can easily be produced with modern production technology, particularly by computer-controlled laser cutting. This has the advantage that the free end face of the tube socket that is on top is freely accessible. From there, the inside of the upper slewing unit can thus be accessed. If a drive motor is disposed in this tube socket, it would not be exposed to the weather, since the tube concerned is tilted downward. Moreover, this free end face can be sealed by means of a cover that can be flanged on, optionally even with the insertion of a rubber gasket. If the particular tube is crosscut straight at both ends—i.e., such that the cutting planes are each intersected perpendicularly by the respective pivot axis—then the sealing cover optionally has a circular circumference and is therefore also especially easy to make. A power box or the like can optionally be mounted to such a cover.

To enable connection to a slewing unit, at least one fastening plate can have a respective plurality of fastening bores, which in particular surround the respective profile coronally with a clearance on all sides. This corresponds to the arrangement of fastening bores in the planar connection surfaces of the slewing units used.

Although connection by means of rivets would also be conceivable, the invention prefers that at least one fastening plate be flanged onto an annular structure of a slewing unit by means of a respective plurality of screws engaging through the fastening bores. On the one hand, such screws can be tightened to a defined torque, and on the other hand, they allow a slewing unit to be replaced without problems.

Further advantages are gained if both slewing units have the same structure or are even of identical construction. Since the two slewing units have to support approximately the same weight and are subjected to roughly comparable tilting moments, the upper slewing unit can be selected to match the lower, somewhat more heavily loaded one, thus placing the design on the safe side overall in terms of technical design.

It has proven effective for at least one slewing unit to have a housing that is one-piece or multi-part, particularly that is configured as a single, cast housing part or is welded or screwed together from a plurality of individual housing parts. Since a solar array—for which the invention is primarily but not exclusively conceived—is almost always operated outdoors, it—and thus the inventive device, as well—is exposed to the weather year-round. To enable the system to tolerate inclement weather without damage over the long term, a preferably splashproof and/or sealed housing is recommended.

The arrangement should be devised so that at least one annular structure of a slewing unit has a circumferential toothing. This represents the contact point for a rotational drive for continuously aiming solar modules at the sun.

A further design rule provides that the circumferential toothing of at least one annular structure of a slewing unit is worked from the same base body as at least one rolling-element raceway disposed thereon. This has the advantage over insertable raceway segments that the rolling elements need not constantly roll across joints between adjacent raceway segments, and thus serves to extend the attainable service life.

The coupling-on of a drive unit can be effected by having at least one pinion and/or at least one worm gear mesh with the circumferential toothing. Whereas a worm gear is able to engage with only an outer toothing, a pinion can be brought into engagement not only with an outer toothing, but also, if necessary, with an internally toothed ring.

If at least one pinion or at least one worm gear is or can be coupled to a braking and/or detent device, a position that has been arrived at can be locked in by engaging such a braking and/or detent device and the drive motor can be switched off, for example in order to conserve power. Thus, for example, "digital" tracking is possible, in similar fashion to a two-point controller that turns the drive on when the deviation of the set orientation from the current position of the sun exceeds a limit value and turns the drive off when the current orientation corresponds to the current position of the sun, or even when preset limit value of opposite sign has been reached. As a braking device, a preferably electromechanically or, if appropriate, hydraulically controllable brake is recommended.

At least one such pinion or at least one such worm gear should be coupled or connected to the drive shaft of a drive motor, particularly of a hydraulic or electric motor, and driven thereby. The choice of drive energy—electric or hydraulic—is usually dictated by the circumstances, particularly by the facilities that will be available in any event. Preferably, the same drive energy—electric or hydraulic—is used as for a braking device.

Within the scope of the invention, it is possible to affix, particularly to flange, the housing of the drive motor outwardly to the housing or the non-toothed ring of the particular slewing unit. Energy can be supplied there very easily by means of an electrical cable or a hydraulic line. Whereas, in the case of the respective lower slewing unit, the part—i.e., the housing or the non-toothed ring—that is connected to the motor housing is connected to the fixed base, with the result that the motor does not change positions during operation and thus can be conveniently connected to the energy supply, the upper slewing unit—and thus the drive motor connected to its housing or non-toothed ring—pivots about the vertical pivot axis of the lower slewing unit in dependence on the rotational position of the latter and must therefore be connected via a flexible element, i.e., a flexible electrical cable, on the one hand, or a bendable hydraulic hose, on the other.

In the above-described embodiment, the toothing is preferably located on the outer circumference of the outer annular structure of the particular slewing unit, particularly in cases where the latter is surrounded on its outer side by a housing. In such cases, one option for use as the drive is a worm gear, which, for one thing, offers a greater reduction ratio than a pinion, since during a rotation of the motor the toothed ring advances by only one tooth, whereas with a pinion it advances by its number of teeth on each rotation of the motor; and which, moreover, is actually self-locking in many embodiments, thus potentially eliminating the need for a braking device.

Another embodiment of the invention is characterized by the fact that the toothing is disposed on the inner circumference of the inner annular structure of the particular slewing unit. The spatial requirements of the device can sometimes be minimized in this way.

The last-described embodiment lends itself to the option of disposing the pinion or gears that mesh with the toothing inside the housing of the particular slewing unit, particularly guiding or mounting them therein. In this case, the housing of the particular slewing unit should extend farther radially inward than the toothed inner ring. The housing could even be configured—at least on a base side of the slewing unit—as a circular disk, i.e., with no opening in the middle.

The invention can be developed further in that one or more gears meshing with the toothing are parts of a planetary gear train, particularly planet gears thereof, with the toothing assuming the function of the ring gear. A planetary gear train is a concentric arrangement and is therefore free of inherent imbalances.

Particular advantages result if such a planetary gear train is constructed in the manner of a Wolfrom gear system, i.e., with a ring gear that is split along a main plane and whose parts have slightly different tooth counts. This makes it possible to obtain an extreme rotation speed reduction ratio from the drive motor to the driven ring on the particular slewing unit. This, in turn, is advantageous in achieving especially precise positioning of a solar array in accordance with the current position of the sun.

If the sun gear of such a planetary gear train is coupled or connected to the drive shaft of a drive motor, particularly of a hydraulic or electric motor, it can be driven by the latter. The housing of the motor can then be fixed to the housing of the particular slewing unit, preferably concentrically with the respective pivot axis.

The drive motor can be disposed inside a base or inside the shared mounting assembly or inside an upholding assembly located on the top side, and is thereby maximally sheltered against external influences, both weather and vandalism or the like.

Finally, it is within the teaching of the invention that the housing of the drive motor is fixed, particularly flanged, to a base or to the shared mounting assembly or to a top-side upholding assembly or to a housing or housing part of a slewing unit. A flanged-on motor can be replaced as needed without complications.

BRIEF DESCRIPTION OF THE DRAWINGS

Further features, details, advantages and effects based on the invention will emerge from the following description of a preferred embodiment of the invention and by reference to the drawing. Therein:

FIG. 1 shows a tracking device according to the invention for single-axis tracking in an elevation direction by a solar array employing a slew drive, in schematic side elevation and illustrated by way of example in three different positions, specifically in the morning (position a), at noon (position b) and in the afternoon (position c), the angle of the tracking in an elevation direction being dependent in each case on the position of the sun and the time of day;

FIG. 3 is a detailed illustration of the solar array according to FIG. 1 in a perspective view;

FIG. 4 is a detail from FIG. 3, with the upper part of the substructure and the slewing unit that is located there;

FIG. 5 shows the substructure of a modified embodiment of the invention, partially broken away;

FIG. 9b is an enlarged illustration of a ballasting element used in FIG. 9a;

FIG. 9c is a perspective representation of a solar array formed by interconnecting a plurality of support structures according to FIG. 9a, in which plural solar panels are lined up side by side and one behind the other;

FIGS. 10a-10d show an again-modified embodiment of the invention in various views and positions;

FIGS. 10e, 10f show a final embodiment of the invention in various views and positions;

DETAILED DESCRIPTION OF THE PREFERRED EMBODIMENT

Figure 2:
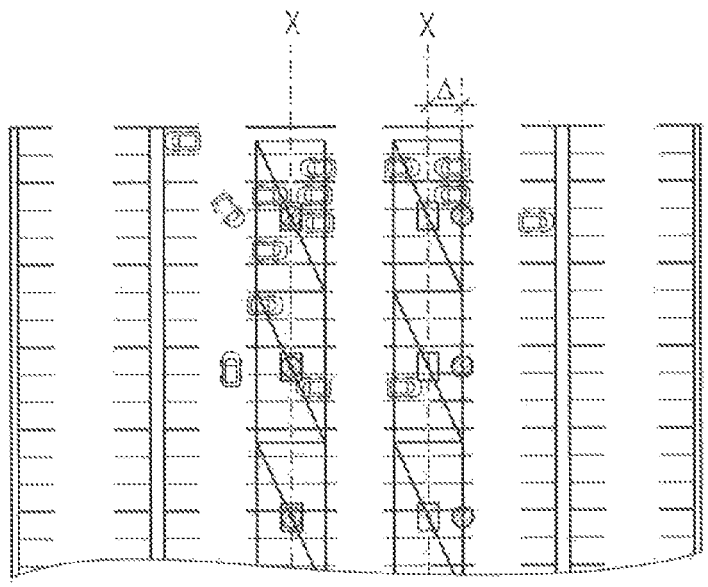
FIGS. 2, 2a are schematic plan views of an open space, for example a parking lot, on which a plurality of solar arrays according to the invention are installed.

FIGS. 1 and 3 show a solar array comprising a tracking device 1 according to the invention. A receiving structure 12 for flat solar collectors 2 is mounted by means of a slew drive 10 on a column 6, as substructure, the foot element 3 of which is, for example, anchored in the ground. In FIG. 1, the main axis MA of the slewing unit 10 runs perpendicularly to the plane of the paper. The particular elevation angle Ω, i.e., the angle which the tilted solar surface makes with the horizontal, is protracted in the plane of the paper.

A control system causes the post-mounted solar surface to track, with the aid of the slewing unit 10, in such a way that it normally remains continuously oriented perpendicular to the incident solar rays.

As position "a" shows, the elevation angle Ω in the illustrated example is therefore greater than 90° in the morning, with a decreasing trend; at noon, in the so-called tabletop position, the elevation angle Ω is equal to 0°, and in the afternoon it assumes negative values.

FIG. 1 also depicts the shadow area SA produced in each case, which migrates with the position of the sun over the course of the day as a result of the tracking according to the invention, but which does not go below a minimum value, in terms of extent, that is defined by the depth D (see FIG. 3) of the solar panel field 2 held up by the receiving structure 12, and thus casts shade throughout the day.

Also readily apparent in FIG. 1 are the possibilities for use created by the correspondingly large height H of the columnar substructure 6, for example the use of the area beneath the mounted solar surface as a shaded or partially shaded parking lot for parking vehicles 20.

Figure 2A:
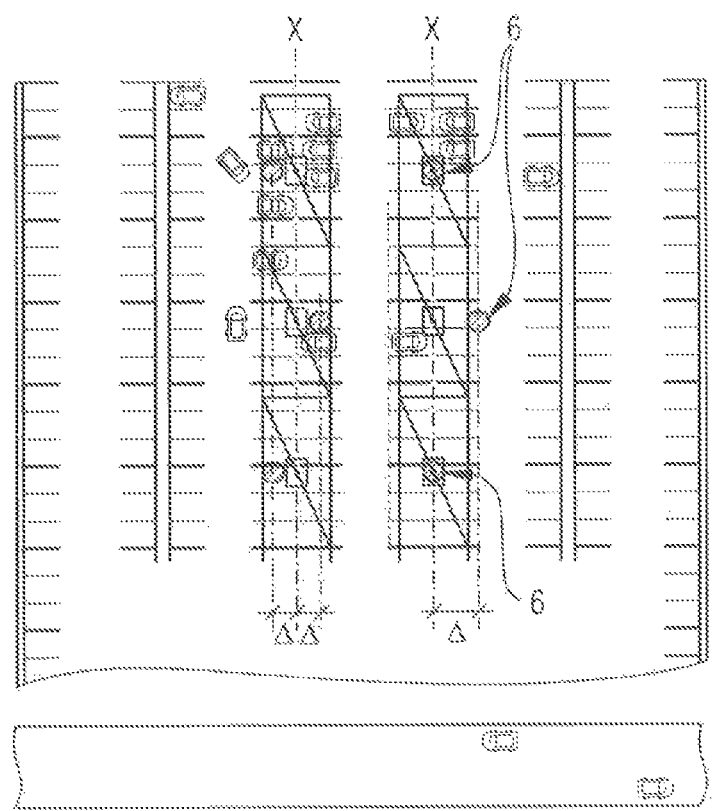

FIGS. 2 and 2a show an open space in the form of a parking lot in plan view, together with a plurality of tracking devices 1 according to the invention in schematic representation. The hash-marked circles (not shown to scale) represent possible locations for the bases 6 of tracking devices 1 according to the invention.

The pillar 6, column 6 or pylon 6 concerned is surrounded by a square area that schematically represents the mounted solar panel surface, with the dimensions W×D. It can be seen that each pillar 6, column 6 or pylon 6 need not always be located under the geometric center of gravity of the mounted surface, but can also be off-center, to the extent recommended or demanded by the available space. This eccentricity is characterized, for example, by a distance Δ that can assume various values.

FIG. 3 shows the tracking device 1 from FIG. 1 in perspective view; the cross-sectionally round column 6 may be noted in particular, although in a further embodiment of the invention this can also be implemented with a rectangular or polygonal cross section. The illustrated tracking device 1 supports a matrix comprising approximately ten times eleven solar panels (PV panels, PV modules) 2 disposed on the receiving structure 12. The receiving structure 12, in turn, is connected via a support structure 13 to the rotatable portion of the slewing unit 10. The receiving structure 12 is fixedly attached to the support structure 13, for example by means of corner-shaped fastening elements, for example flat bars or angles, that are preferably welded on.

The main axis MA can be rotated directly by the slewing unit 10.

The enlargement in FIG. 4 depicts that only one slewing unit 10, including at least one motor drive 15, is necessary for rotatably mounting the receiving structure 12 on the substructure 6. In point of fact, according to another embodiment of the invention it is conceivable to use two or more slewing units 10 that are suitable for adjusting the associated support structure 13 along the main axis MA.

FIG. 4 shows the manner in which the slewing unit 10 is indirectly attached to the substructure 6 and to the receiving structure 12. The non-moving ring 19 of the slewing unit 10 is affixed via a mounting device 14 to the substructure 6, whereas the rotatable ring 21 of the slewing unit 10 is connected via the support structure 13 to the receiving structure 12. The two mutually concentric, annular structures 19, 21 are mounted adjacent to each other, particularly one inside the other, and for purposes of mutual relative adjustment are coupled to at least one drive 15. The coupling is effected inside the housing. The drawing actually shows two drives 15, each with a respective worm gear that enables them to simultaneously mesh with the toothing on the rotatable ring 21.

The perspective in FIG. 4 is obliquely from below. Readily visible in the background are the receiving structure 12 and the planar elements 2 or surfaces 2 installed on said system. It is disclosed here, by way of example, that the support structure 13 constantly orients itself along the main axis MA. The support structure 13 can be adjusted by means of the slewing unit 10. In this arrangement, that concentric element of the slewing unit 10 which has the smaller diameter 19 is directly connected to the support structure 13, e.g. welded, screwed or pressed thereon. In the concentric arrangement, the connection element 19 having the larger diameter is mounted via a rolling bearing, for example a roller bearing or a conical roller bearing, or in most cases via a ball bearing, rotatably 19 with respect to the annular structure 21 having the smaller diameter. The two concentric rings 19, 21 thus are always mounted rotatably with respect to each other. The mutual relative adjustment of these concentric rings 19, 21 is effected by means of at least one drive 15, here actually via two drives 15. These drive elements 15 drive, for example, the toothed ring via a worm gear positioned in the housing of the slewing unit 10. The substructure 6 is fixedly connected to the mounting device 14, for example via a large number of screws.

FIG. 5 shows the column 6, which is foldably implemented by means of a hinge 23, the upper part 6' of the substructure 6 being able to pivot or fold down about a horizontal axis relative to the lower part 6" of the substructure 6. The lower part 6" is connected to the ground, the foundation, or a building part. The upper part 6' is connected directly or indirectly to the slewing unit 10 according to the invention. Once the pylon 6 or column 6 or pillar 6 has been erected, the two wings of the foldable arrangement are screwed together 24 at at least one location eccentrically to the pivot axis 28, to keep them from folding back. Additional securing screws 27 can also preferably be used for this purpose. The bolt 28 is located in the center of the hinge 23 but next to the actual column 6, and is the connecting element of this foldable device; the eccentric arrangement makes it possible for the upper part 6', including the hinge wing, to be folded up when the screws 24, 27 are disengaged. Additional parts of this hinge joint 23 are the wings 25, each of which is connected on one side 6', 6", and the hinge elements 26, which surround the hinge bolt 28 and are arranged one behind the other or offset in the longitudinal direction of the hinge bolt 28 and are each connected to a respective wing 25.

As FIG. 5 further shows, the base 3 can be fixedly mounted on the building or on the ground, particularly at the top edge of the building or the landscape, for example by being bolted to the floor of the foundation or to a sturdy plate; the column 6 or other substructure is fastened thereto. Shown in dashed lines are chambers 22 that form mutually separate stowage spaces/storage areas, for example for energy sources or energy modules, and for example can be accessed by folding open the hinge joint 23 and/or through side doors in the column 6, 6', 6".

Figure 6:
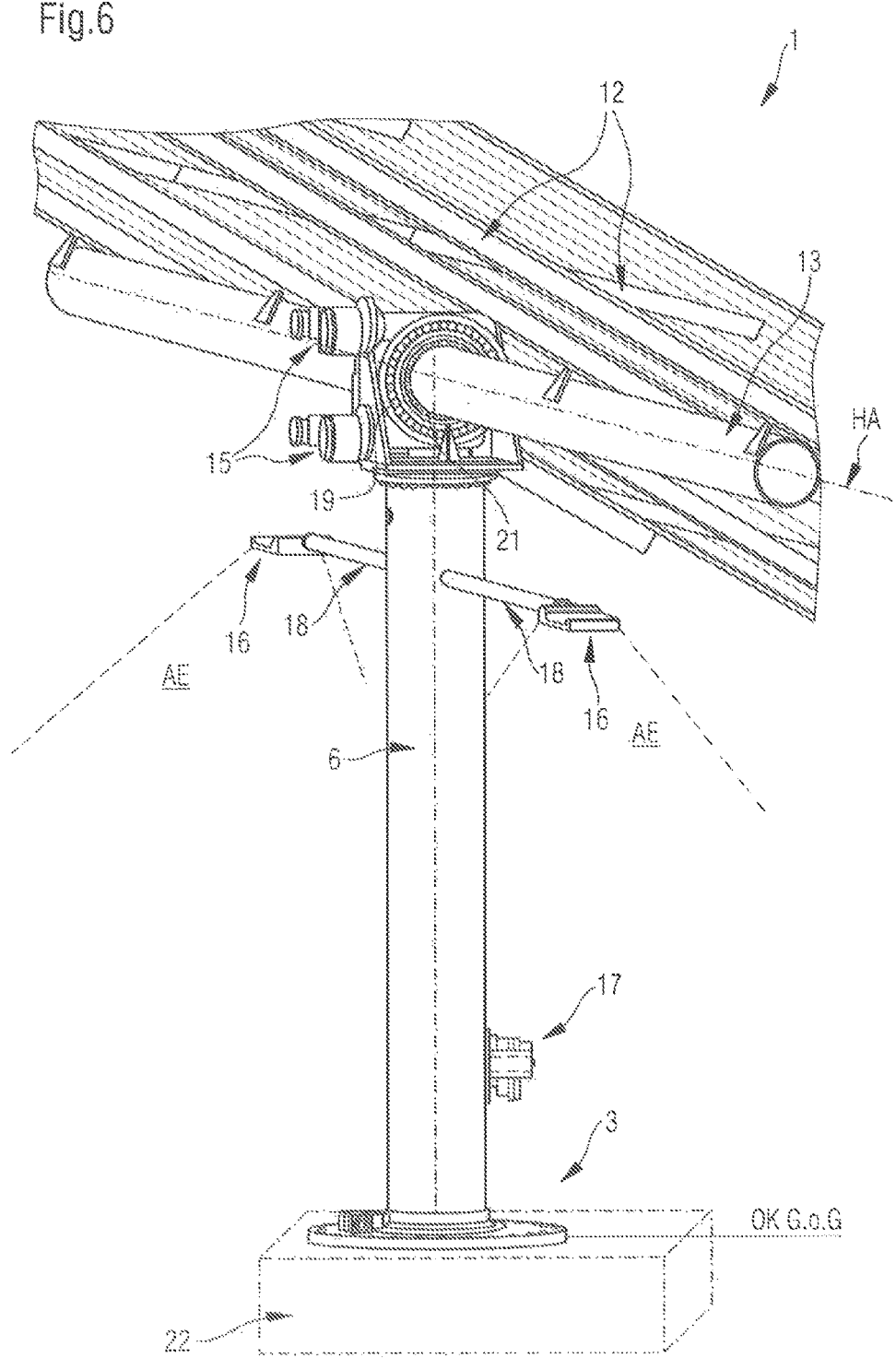
FIG. 6 represents a further-modified embodiment of the invention in a view approximately corresponding to FIG. 3, partially broken away.

FIG. 6 describes in particular, by way of example, that the aforesaid chambers 22 can also be located under the base 3, for example in the ground, or inside part of a building if the substructure 6 is installed on part of a building. These chambers 22 are preferably inside the column (see FIG. 5), but can also lie below the base plate of the column 6 in special, exceptional cases, as long as the column is then adequately supported by the foundation.

FIG. 6 shows an embodiment of the invention that is modified with respect to FIG. 3 in that at least one mounting device 18, for example for lamps or the like, is disposed on the column 6. This mounting device 18 can comprise, for example, two projecting cantilever arms, to which, for example, billboards or lighting units or other equipment can be attached and held at a heightwise distance above the ground (top edge of building or landscape).

Lamps 16 attached to the mounting device 18 can be used to illuminate the area IA under the slewing unit 10. If these illuminants 16 are operated when it is dark, then the solar energy that has been collected and temporarily stored by the installed solar panels 2 throughout the day is used to illuminate the area underneath. The illuminated area IA can assume a large or a small illumination angle, depending on the light fixtures 16 used.

Also illustrated in FIG. 6 is an electrical coupling device 17 to which electrical loads can be connected, e.g. for the purpose of supplying energy to electric vehicles. This can be a type of plug coupling, optionally at the end of a pull-out cable, for plug connection to an electric vehicle. It would also be possible, however, to transmit the power to a load, particularly to an electric vehicle, by electromagnetic or inductive means, in a similar manner to a transponder, which by inducing a voltage in a coil draws current from an electromagnetic field in order to charge an electric storage device in a mobile unit.

Figure 7A:
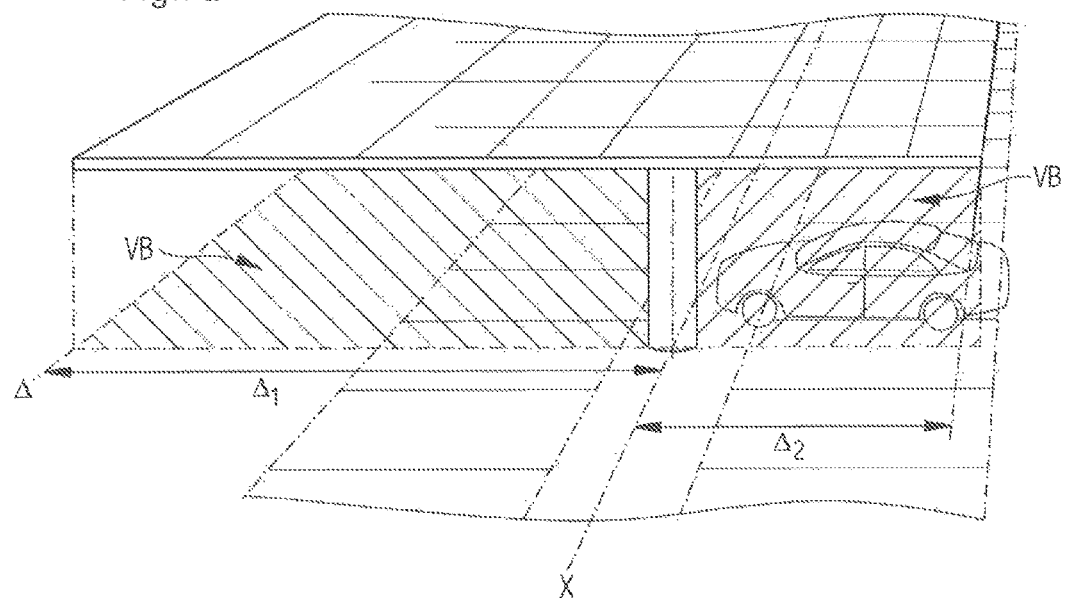
FIGS. 7a, 7b show different embodiments of the invention, with the interconnection of a plurality of support structures illustrated in perspective.
Figure 7B:
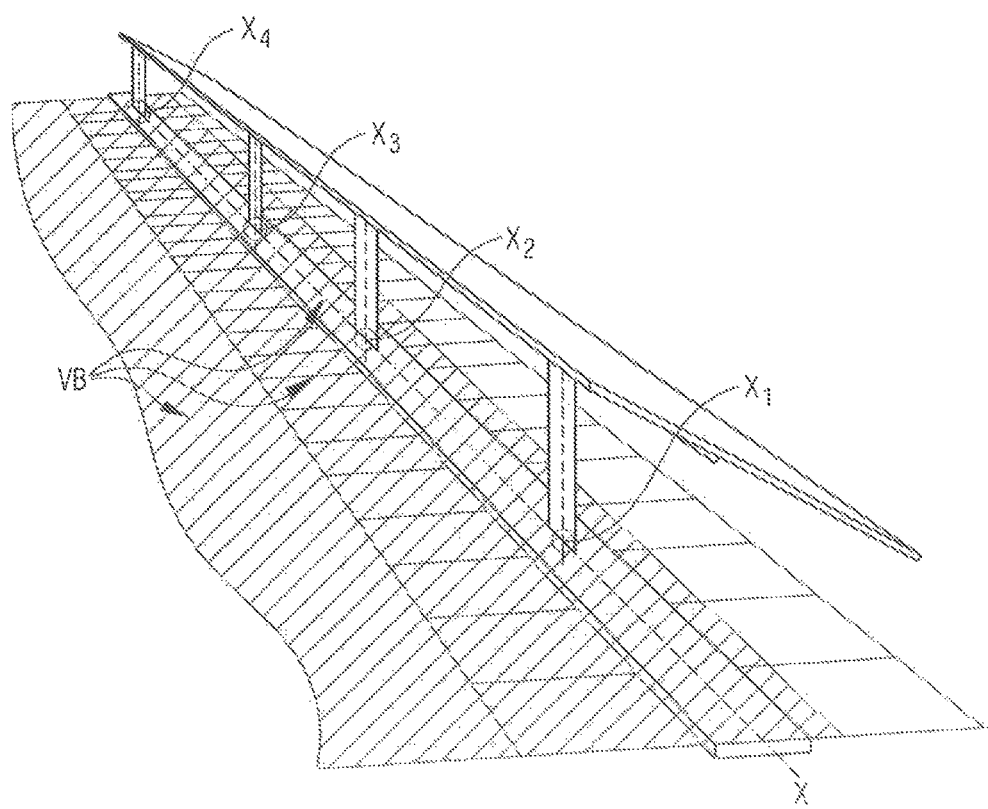

FIGS. 7a and 7b exemplarily illustrate the use of a plurality of tracking devices 1 according to the invention as so-called parking lot solar trackers, employing the "massive structure" embodiment in a strung-together arrangement. A plurality of these tracking devices 1 are set up next to one another in an open space, in a parking lot in the case shown. The area at ground level can be used for parked vehicles 20, for example. When it is dark, here the surface W×D held up by the receiving structure 12 is in the tabletop position; see FIG. 7a. Lighting systems 16 for illumination purposes, as mentioned above, can be used to light the parking lot in the dark. In the example shown here, a pylon 6 is positioned, not exactly under the geometric center of the deployed surface, but slightly off-center. The following relation applies here: $|\Delta_1| \neq |\Delta_2|$. In this example, all the substructure units 6 are fastened to the ground (at $X_1, X_2, X_3, X_4$) and are located on an imaginary line X. According to FIG. 7b, the deployed surfaces W×D produce shade in bright light, thereby creating shadow areas SA near ground level (top edge of building or landscape).

Figure 8:
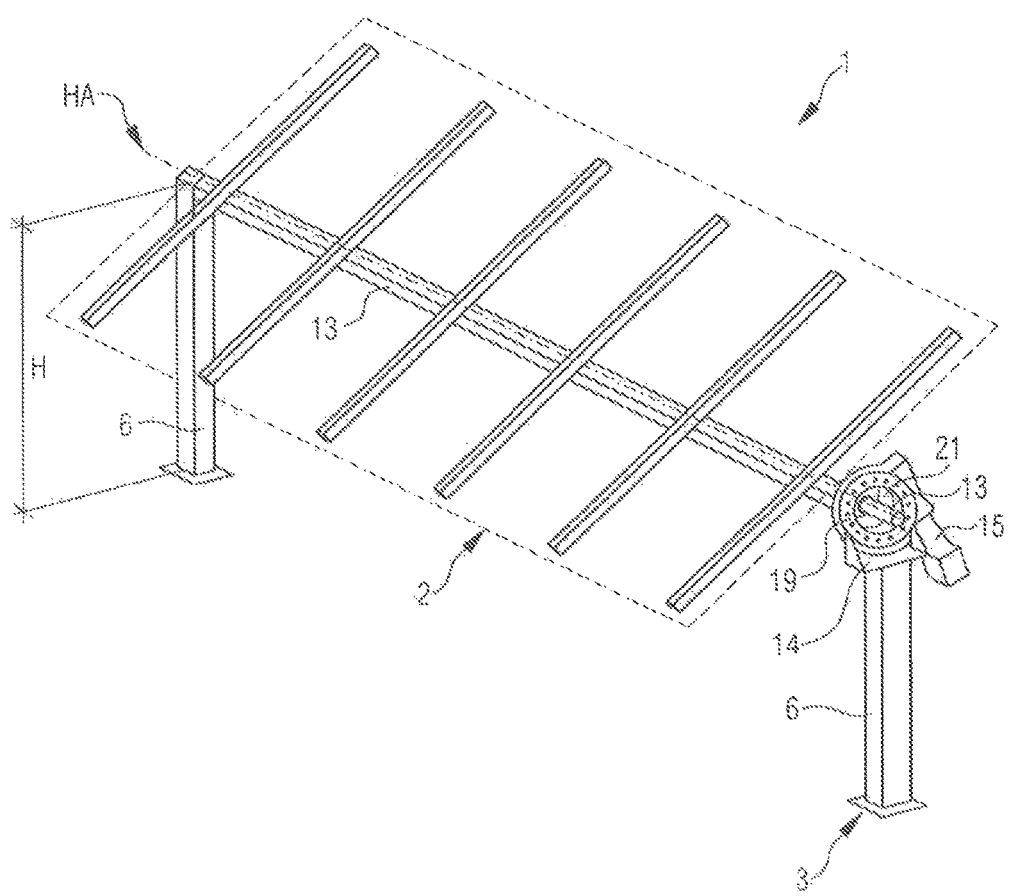
FIG. 8 shows an again-modified embodiment of the invention in a perspective view taken obliquely from above, with the contours of the solar collectors merely suggested.

FIG. 8 depicts a tracking device 1 exemplarily and in perspective, in a view taken obliquely from above, with the column 6 shifted all the way to the edge of the solar panel surface; a second column 6 is provided in this case, to give reliable support, and is located approximately diametrically opposite the first column 6 with respect to the center of the solar panel surface, but also on the main axis MA. There, the support structure 13 is bearing-mounted a second time, although preferably without a driven slewing unit 10, but instead merely in a solely passive (rolling) bearing.

Figure 9A:
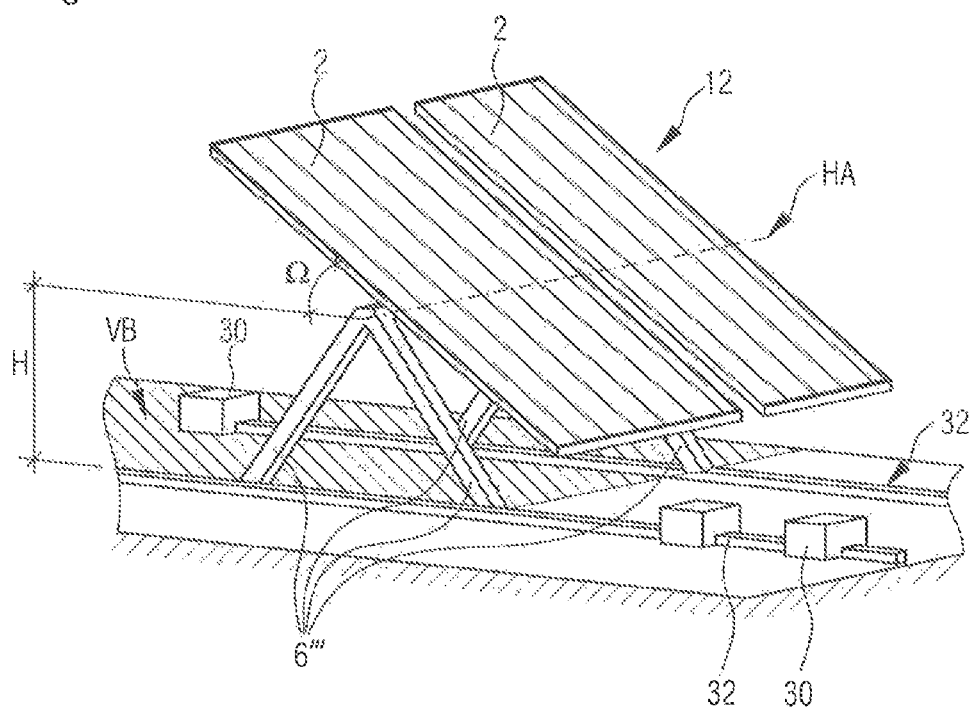
FIG. 9a an again-modified embodiment of a support structure according to the invention in a perspective view, comprising a multi-part, truss-like mounting structure held in place by a plurality of ballasting elements.
Figure 9B:
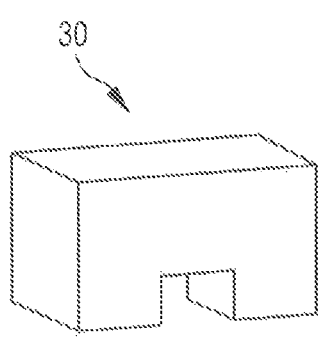

FIGS. 9a to 9c illustrate additional solar mounts, but employing the so-called "lightweight structure." Here again, use is made of a slewing unit 10 according to the invention that comprises two mutually concentric, annular structures 19, 21, which are mounted rotatably relative to each other and for purposes of mutual relative adjustment are, for example, coupled to a drive 15. This slewing unit 10 rests on a substructure 6, for example in the form of a rack comprising a plurality of pillars, each having two struts that converge toward each other from bottom to top. The slewing unit 10 serves to rotate a support structure 13 that preferably has an elongate structure, for example in the form of a tube or profile, which is oriented along the main axis MA. In accordance with the inventive idea, the main axis MA is always oriented approximately horizontally, and thus approximately parallel to the surface on which the substructure 6 as a whole stands. Fastened to the support structure 13 is the receiving structure 12, which can support planar elements 2 or surfaces 2, for example solar panels or billboards, that are fixedly installed on it.

In comparison to the so-called massive structure, the height H of the substructure 6 is relatively small in the case of the lightweight structure depicted in FIGS. 9a to 9c that serves as a mounting system for the device 10 according to the invention. For example, the height H of the substructure 6 is less than the height of a human being. FIG. 9a also schematically indicates the shadow area SA created under the held-up surface in the presence of adequate solar radiation conditions.

FIGS. 9a and 9b are mutually corresponding depictions of only two mounted elements 2 in isolation and the fastening options for the mount 6''' or the foot rails 32 thereof. Illustrated here are not only the shadow area SA, but also two planar surfaces 2, for example implemented as solar panels (PV panels; PV modules), which are currently adjusted by the elevation angle Ω Also illustrated are the foot rails 32, which need not be bolted to the area of ground or floor with which they are in contact, but merely rest loosely thereon and are held securely on the surface of the foundation by means of so-called cinder blocks 30 or other ballasting elements 30. These cinder blocks 30 can have, for example, a bridge-like shape, somewhat like an upside-down "U", with the height of the recess on the bottom side for example corresponding to the height of a foot rail 31. A plurality of these cinder blocks 30 or other ballasting elements 30 can be used. A plurality of such cinder blocks 30 or ballasting elements 30 are normally used to ensure sufficient positional stability for the system as a whole. The substructure 6''' in this example is a rack or framework, which may also be conceived of as a truss, made of lightweight profiles or tube structures or other elongated semi-finished products, ideally ones designed for ultra-light overall systems. The height H of the substructure 6 is preferably equal to or less than the height of a human being, i.e., preferably equal to or less than two meters.

FIG. 9c depicts an entire solar field with a plurality of solar mounts, as a use case of the lightweight structure. In the middle of this solar array there is, for example, only one slewing unit 10 for active adjustment of the planar surfaces 2 or elements 2 on a single axis in elevation. The illustrated planar surfaces 2 or elements 2 are solar panels (PV panels; PV modules) by way of example here, and are all adjusted in the same elevation direction by this single slewing unit 10 disposed as centrally as possible. The planar surfaces 2 or elements 2 are rotated by the rotation of the support structure 13 about a main axis MA. It is important in this exemplary embodiment that all the planar surfaces 2 or elements 2 that are present are always adjusted identically as soon as the centrally disposed slewing unit 10 performs an adjustment. This is accomplished by the fact that the respective planar surfaces 2 or elements 2 are connected to one another by a corresponding multi-part mechanical linkage 31, 31', 31".

Figure 10A:
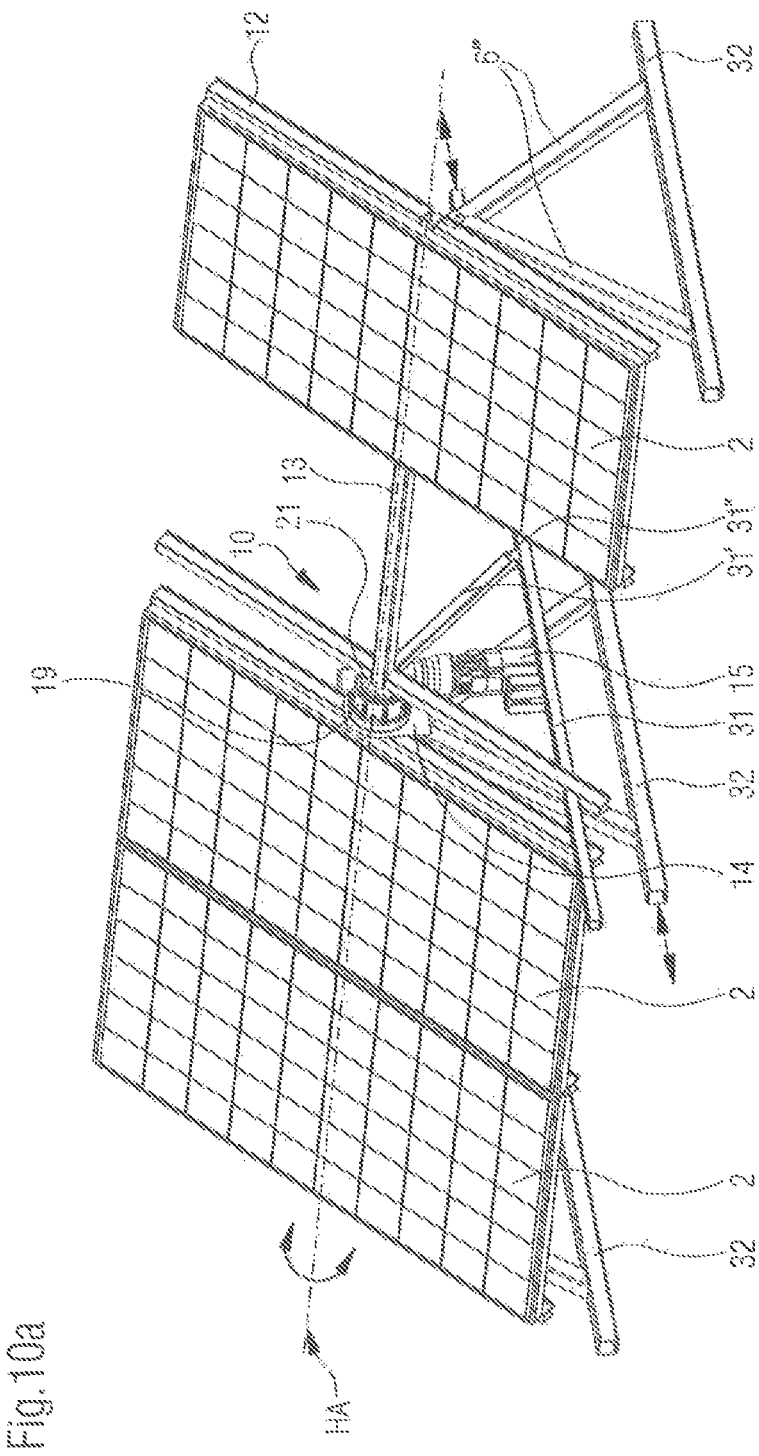

FIG. 10a also shows that all of the illustrated adjacently placed planar surfaces 2 or elements 2 are disposed pivotably about the common horizontal main axis MA on a substructure 6 comprising a plurality of preferably mutually parallel foot rails 32.

FIGS. 10a to 10f show a solar field in which a plurality of solar panels 2 are arranged in rows one in front of the other and side by side. The exemplary solar field is adjusted in elevation by the angle Ω by means of a slewing unit 10 according to the invention, said slewing unit 10 preferably being affixed to the substructure 6, for example to a foot rail 32. Apparent in the drawing is at least one horizontally oriented pushrod 31, which connects a front row to a row of planar surfaces 2 or elements 2 located behind it. The pushrods 31 are each coupled via a linkage 31" to the receiving structure 12. The planar surface 2 or planar element 2 is fixedly installed on the receiving structure 12. The support structure 13, which is always oriented along a main axis MA, is rotatable by means of the slewing unit 10. When the support structure 13 is adjusted by the device 10 according to the invention, the receiving structure 12 is also adjusted in the same direction, since said receiving structure 12 is fixedly connected to the support structure 13. Because the linkage 31' of the pushrod is also fixedly connected to the receiving structure 12, the latter also adjusts in elevation and in the same direction as the adjustment of the support structure 13. This rotational movement will be converted by the linkage 31" that is fastened to the respective pushrod 31 into a largely translational movement of the pushrod 31 in a horizontal direction. The rotational movement in elevation Ω is thus transmitted by a substantially translational movement of the pushrod 31 from one row of plural solar panels 2 to the row of plural solar panels 2 in front of or behind it. All the solar panels—or, more generally, all the planar surfaces 2 or elements 2 present—that are connected to one another in this manner are directly or indirectly coupled or connected to the support structure 13 via the resulting adjustment mechanism. Thus, when the support structure 13 is adjusted due to actuation of the slewing unit 10 according to the invention, all the planar surfaces 2 or elements 2 so connected are adjusted by the same elevation angle Ω.

To this end, a linkage 31' comprising a pushrod 31 is disposed between coupled-together support structures 13. As soon as the driven support structure 13 is set in rotation by the slewing unit 10, the linkage 31' is also simultaneously set in motion. This motion is converted by hinges 31", which are fastened to the respective pushrod 31, into a largely translational movement of the pushrod 31 in a horizontal direction and is transmitted as such a translational movement. Hence, the rotational movement in elevation Ω is transmitted by an essentially translational movement of the pushrod 31 from one row of plural planar surfaces 2 or elements 2 to the row of similar elements located in front of or behind it. All the planar surfaces 2 or elements 2 present that are connected to one another in this manner are directly or indirectly connected to the support structure 13 via the aforesaid adjustment mechanism. Thus, when the support structure 13 is adjusted due to actuation of the slewing unit 10 according to the invention, all the planar surfaces 2 or elements 2 so connected are adjusted by the same elevation angle Ω.

According to FIGS. 10e and 10f, the slewing unit 10 need not be fastened directly to a support structure 13, but can instead be coupled via a linkage 31.

Figure 11:
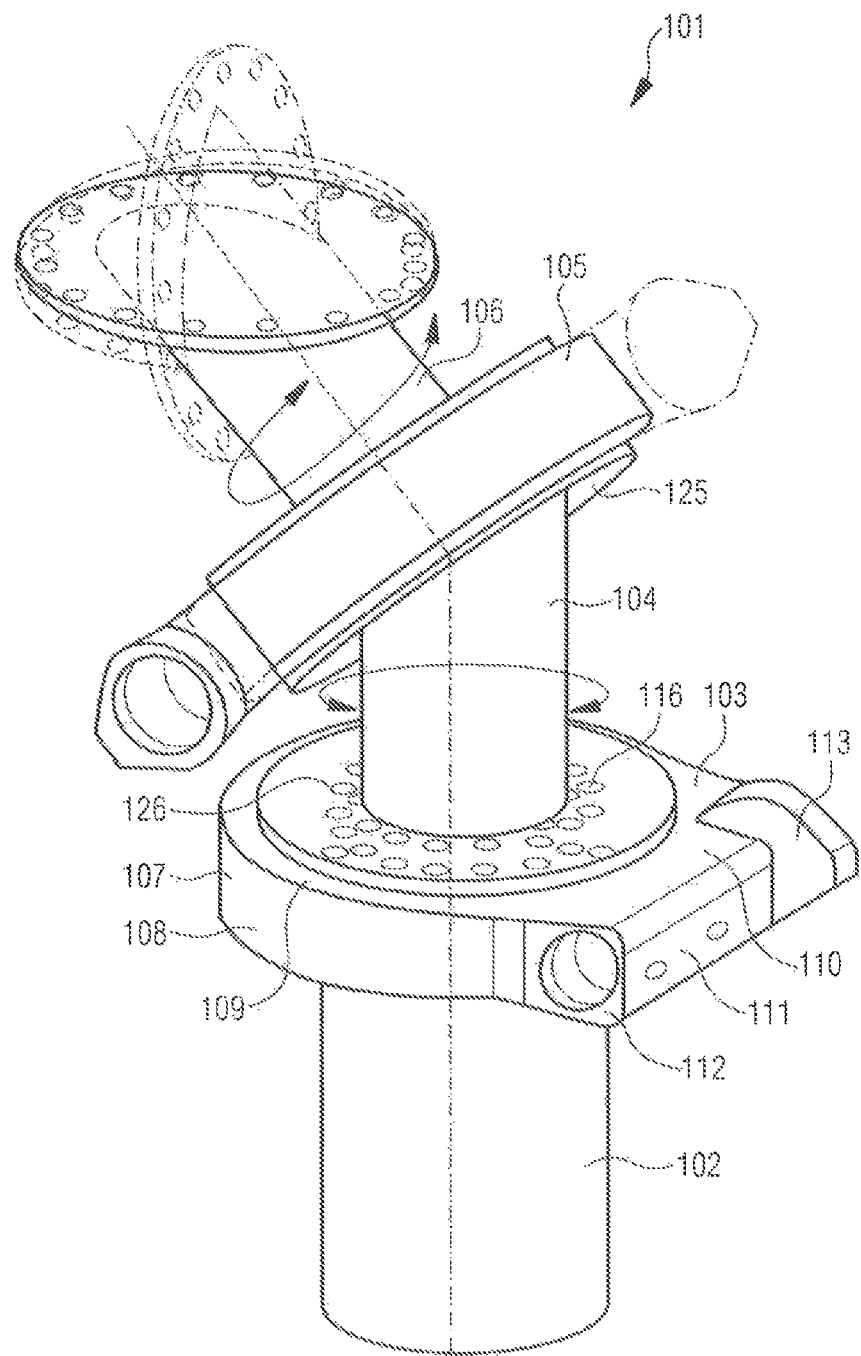
FIG. 11 shows a tracking device according to the invention in a perspective view, in which various slew positions are illustrated by solid, dashed and dot-dashed lines.

The tracking device 101 shown in FIG. 11 is conceived of as an adjustable supporting construction for a planar frame for mounting one or preferably a plurality of solar modules, the frame and the solar modules having been omitted from the drawing for the sake of clarity.

The tracking device 101 is essentially composed of five assemblies: a foundation 102, a lower slewing unit 103 connected via a mounting assembly 104 to an upper slewing unit 105, and an upholding assembly 106 that holds up the frame per se.

The two slewing units 103, 105 can be of identical construction, although this is not mandatory. Since in the normal case they should at least have the same structure or a similar construction, this preferred structure for both slewing units 103, 105 will be described jointly below.

Each slewing unit 103, 105 includes two respective mutually concentric rings made of metal. The two rings are preferably arranged radially one inside the other and therefore lie approximately in a common plane. They can thus be referred to as an inner ring and an outer ring. Between the two rings there is a gap, such that they can be rotated relative to each other about the common axis. So that their relative positions are exactly maintained during such rotation, disposed in the gap between the two rings is one or more rows of rolling elements, which roll along one respective raceway per ring and per row of rolling elements and are preferably biased in such a way that there is no play between the two rings. The rolling elements can be balls, rollers, needles, barrels or the like.

One of the two rings is provided with a circumferential toothing, preferably on its jacket surface facing away from the gap. This toothing is preferably covered by a housing 107 that is fixed to the respective other ring or is connected thereto, for example integrated therewith. This housing 107 itself is preferably comprised of a cylinder-jacket-shaped housing part 108 and a circular-disk-shaped housing part 109, which can be connected to each other or even produced integrally with each other, for example cast together from a molten material.

As can be appreciated from FIG. 11, the housing 107 has a radial extension 110, which is bounded by a surface region 111 that is approximately tangential to the cylinder-jacket-shaped part 108 of the housing 107 and by two end faces 112 that join said region to the cylinder-jacket-shaped part 108 of the housing. Mounted in this housing extension 110 is a worm gear whose longitudinal axis runs approximately tangentially to the outer ring. This worm gear is not shown in FIG. 11; if it is used, however, it meshes with a circumferential toothing on the outer circumference of the outer ring and is therefore capable, when driven by a motor, of bringing about a defined relative rotation between that ring and the housing 107. To add a motor, a drive motor can be flanged to an end face 112, optionally provided with protrusions 113, of the housing extension 110 in such a way that the drive shaft of the drive motor is rotationally fixedly coupled to the worm gear, for example via a spring that can be seated in grooves. A braking device, for example, could be flanged onto or otherwise affixed to the opposite end face 112 of the housing extension 110.

The feed lines to the braking device, as well as the feed lines to the drive motor, can be gathered together in a switchbox, which could optionally be fixedly screwed to the surface region 111 of the housing extension 110.

Each of the two rings of a slewing unit 103, 105—or one ring thereof, on the one hand, and the housing 107 rotatable relative thereto, on the other—has a respective planar connection surface 114, 115 for connection to the base 102 on the one side and the mounting assembly 104 on the other side, or for connection to said mounting assembly 104 on one side and the upholding assembly 106 on the other side.

These two connection surfaces 114, 115 of a slewing unit 103, 105 are disposed oppositely from each other, i.e., one is on the top side and one on the bottom side thereof. If a connection surface 114 is formed on a housing 107, it is preferably on the top side, so that the cylinder-jacket-shaped housing part 108 surrounds the particular slewing unit 103, 105 in the manner of a skirt hanging down and thus protects the gap between the housing 107 and the ring rotatable relative thereto to the greatest possible extent against the effects of weather such as rain or snow.

Each of the two connection surfaces 114, 115 is provided with a respective plurality of fastening bores 116, which are in particular distributed coronally over the circumference. These are preferably blind bores with an internal thread, into which machine screws can be turned.

Each connection surface 114, 115 of each slewing unit 103, 105 has a respective assembly connected to it, i.e., either the base 102, the mounting assembly 104 or the upholding assembly 106.

These three assemblies 102, 104, 106 have a comparable structure: each is composed of a middle part 117, 118, 119 made from a profile of constant cross section and having at both ends fastening means for connection to a foundation (not shown) or to a slewing unit 103, 105 or to the planar frame on which the actual solar modules are mounted.

With regard to the base 102 only, the latter may not need a fastening means on the bottom side if it is to be wholly encased in a concrete foundation. Apart from that, the base 102 has a top-side connection plate 120 for connection to the bottom connection surface 115 of the lower slewing unit 103.

The mounting assembly 104 has a lower connection plate 121 for connection to the top connection surface 114 of the lower slewing unit 103, and an upper connection plate 122 for connection to the bottom connection surface 115 of the upper slewing unit 105.

The upholding assembly 106 comprises a lower connection plate 123 for connection to the top connection surface 114 of the upper slewing unit 103, and an upper connection plate 124 for connection to the bottom side of the frame supporting the solar module per se.

The connection plates 120-124 are preferably welded, particularly butt-welded, to the end faces of the middle parts 117-119.

For this purpose, the cylinder-jacket-shaped, particularly circular-cylinder-jacket-shaped, middle parts 117-119 open at each of their two ends in a respective planar end face. A respective connection plate 120-124 is then welded thereto, except, where appropriate, to the bottom end of the base 102.

The connection plates 120-124 each have a circular circumference whose radius in each case is larger than the radius of the adjacent middle part 117-119, such that the connection plates 120-124 protrude past the middle parts 117-119 in the manner of a circumferential flange. Disposed in each of these flange-like protruding regions 125 is a plurality of preferably coronally distributed fastening bores 126, which are aligned pairwise each with a respective fastening bore 116 in a slewing unit 113, 115 and enable the slewing units 103, 105 to be connected to the assemblies 102, 104, 106 by means of screws.

Figure 12:
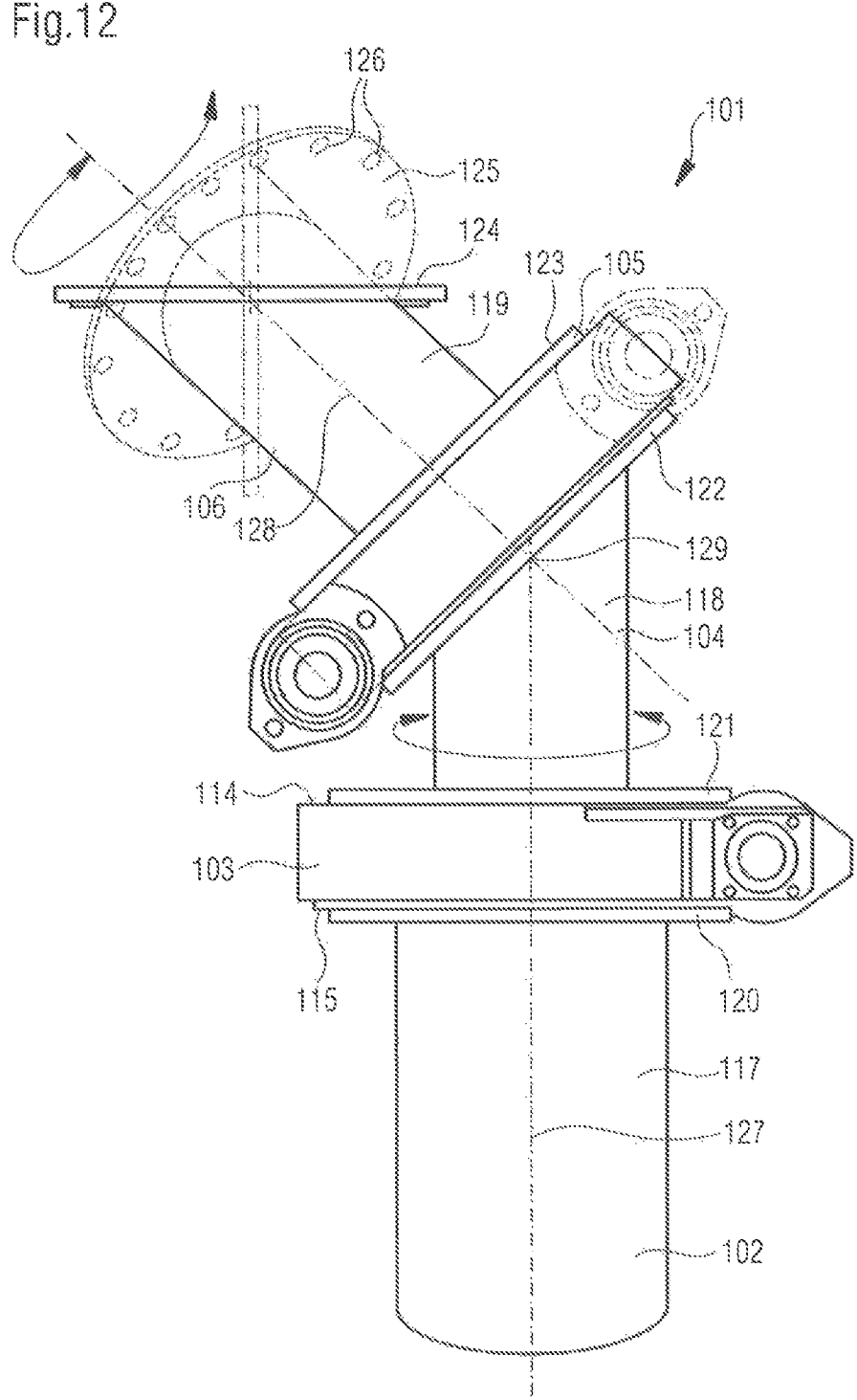
FIG. 12 is a side elevation of FIG. 11.

As can be further discerned from FIGS. 11 and 12, the two end faces of the base 102 are parallel to each other. As a result, the main plane of the lower slewing unit 103 supported directly by the base 102 lies in a horizontal plane. The pivot axis 127 of the lower slewing unit 103 therefore runs vertically. The upper connection surface 114 of the lower slewing unit 103 and the thereto-affixed connection plate 121 of the mounting assembly 104 and the middle part 118 thereof thus do not change their positions in space in response to a pivoting about the axis 127.

As FIGS. 11 and 12 further show, the upper end face of the mounting assembly 104 and the upper connection plate 122 attached, for example welded, thereto is not parallel to the lower connection plate 121 of the mounting assembly 104; consequently, it does not lie in a horizontal plane, but is inclined by an angle $\beta$ to the horizontal. In the present example, $\beta=45°$. This has the result that the upper connection plate 122 of the mounting assembly 104 executes a kind of nutating motion during a pivoting about the axis 127, wherein a ray passing perpendicularly through it moves along a conical surface.

This, in turn, has the result that during a pivoting motion about the pivot axis 127, the upper slewing unit 105 also executes such a nutating motion, wherein the upper pivot axis 128 passing perpendicularly through it moves along a conical surface. In the present example, this cone has an opening angle of $2 \times 45° = 90°$.

It can further be understood from FIGS. 11 and 12 that the upholding assembly 106 is of substantially identical construction to the mounting assembly 104: the middle parts 118, 119 have approximately the same geometry, and in particular, in each case an end face—and thus also the connection plate 121, 123 affixed thereto—is intersected perpendicularly by the longitudinal axis of the middle part 118, 119, whereas the respective other two end faces—and thus also the connection plates 122, 124 affixed thereto—form the same angle $\beta$ with the longitudinal axis of the respective middle part 118, 119; in the present case, $\beta=45°$.

As can be seen particularly clearly from FIG. 12, the upper pivot axis 128 forms with the lower pivot axis 127 at their common intersection point 129 an intermediate angle $\alpha=135°$, and with the upwardly prolonged pivot axis 127 the angle complementary thereto, $\beta=45°$. Depending on the rotational position of the upholding assembly 106 about the upper pivot axis 128, in one extreme position its inclination angle $\beta=45°$ is subtracted from the inclination angle $\beta=45°$ of the mounting assembly 104 to yield an angle $\gamma=\alpha-\beta=0°$ (the position of the upholding assembly 106 shown in solid lines, with the upper connection plate 124 oriented horizontally), or in the other extreme position, these two inclination angles $\beta=45°$ are added together to yield an angle $\gamma=\alpha+\beta=90°$ (the position of the upholding assembly 6 shown in dot-dashed lines, with the upper connection plate 124 oriented vertically).

In the dot-dashed position, the vertically oriented connection plate 124 can be rotated to any of the four points of the compass by a pivoting about the lower pivot axis 127.

The two extreme positions differ in that the upper slewing unit 105 has been rotated 180° on its pivot axis 128, a fact that can also be recognized from the different positions of the housing extension 110. When the upper slewing unit 105 is rotated 90°, on the other hand, it reaches the position illustrated in dashed lines. By setting various intermediate angles on the upper pivot axis 128, the inclination of the uppermost connection plate 124 can be adjusted smoothly between the horizontal and the vertical and then rotated to any of the four points of the compass by setting various intermediate angles on the lower pivot axis 127. It thus is readily possible, by means of the uppermost support plate 124, to orient a frame occupied by solar modules to any point on the compass, from any point on the circumferential horizon ($\gamma=90°$) up to the zenith ($\gamma=0°$).

Figure 13:
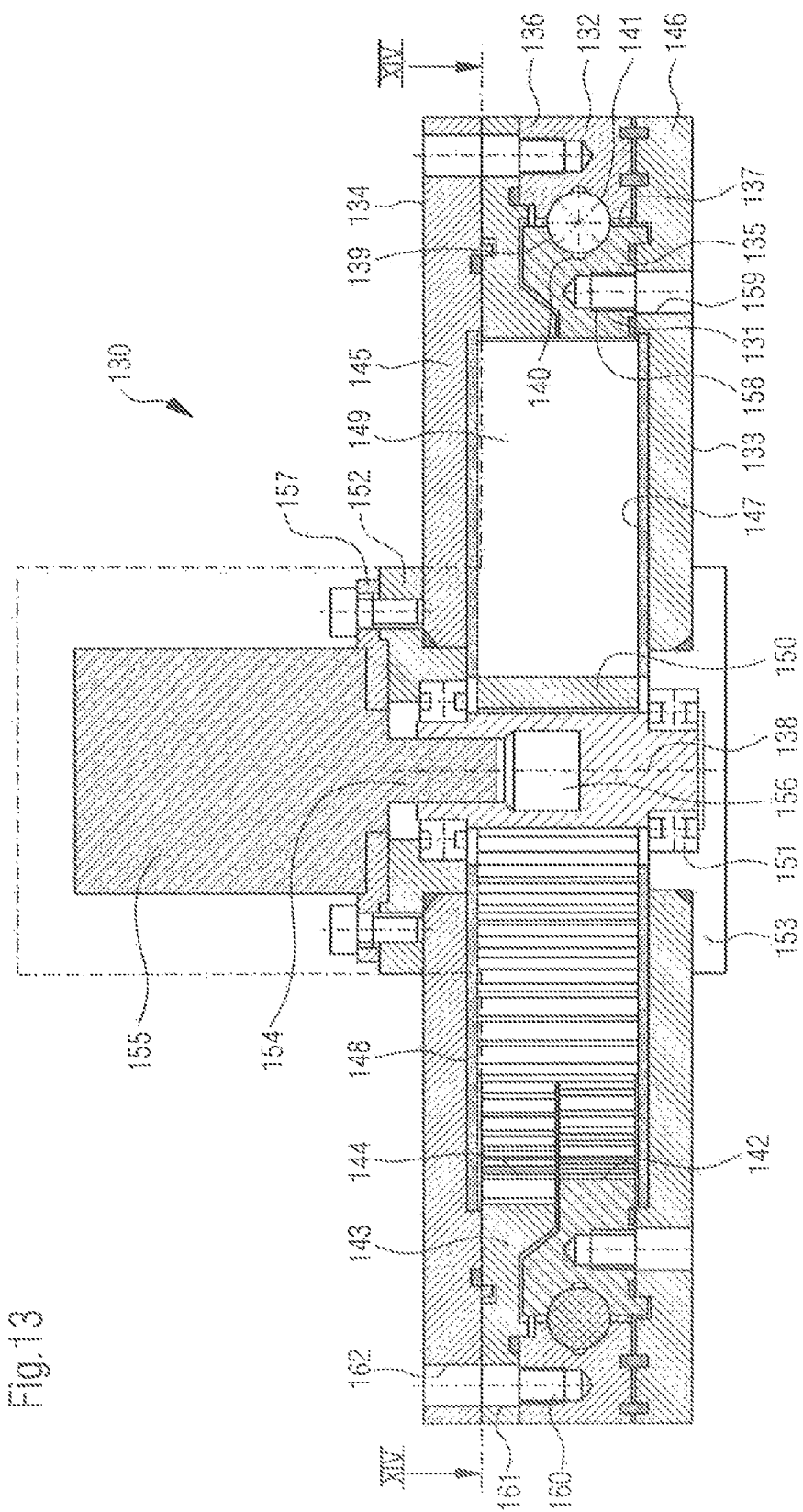
FIG. 13 is a vertical section through a modified embodiment of a slewing unit for use in the device according to FIGS. 11 and 12.
Figure 14:
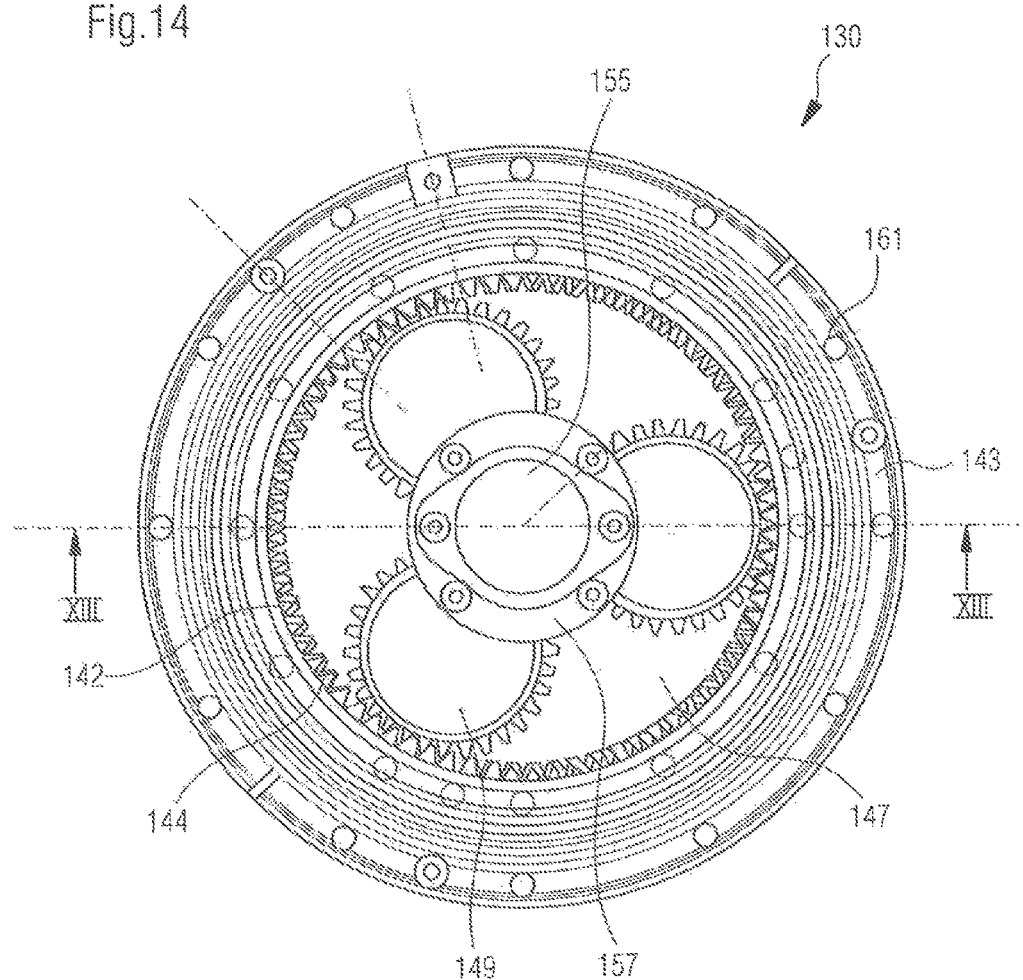
FIG. 14 is a horizontal section through FIG. 13.

Illustrated in FIGS. 13 and 14 is another type of slewing unit 130 that can be used instead of one or both of the slewing units 103, 105 described above, optionally in combination with the assemblies 102, 104, 106.

Here again, there are two annular connection elements 131, 132 that can be rotated relative to each other, each of them having a planar connection surface 133, 134 for connection to a connection plate 120-123 of an assembly 102, 104, 106.

Each of the two connection elements 131, 132 basically consists of a ring 135, 136 and a housing part 145, 146.

The two rings 135, 136 are arranged concentrically with one another and radially one inside the other and thus lie approximately in a common lane. They can thus be referred to as an inner ring 135 and an outer ring 136. Between the two rings 135, 136 there is a gap 137, such that they can be rotated relative to each other about the common axis 138. So that their relative positions are exactly maintained during such rotation, disposed in the gap 137 between the two rings 135, 136 is at least one row of rolling elements 139, which roll along one respective raceway 140, 141 per ring 135, 136 and row of rolling elements. Said rolling elements 139 can be balls, rollers, needles, barrels or the like.

The radially inwardly disposed ring 135 is provided on its inner jacket surface facing away from the gap 137 with a circumferential toothing 142, in the manner of a ring gear of a planetary gear train.

The end face depicted as the upper end face of the outer ring 136 in FIG. 13 has an additional ring 143 resting flat against or on it; this ring 143 could also be directly connected to the outer ring 136 or could even be produced integrally therewith, for example by being solidified from a melt in a common mold or forged from a common base body. This additional ring 143 extends radially inward to the radially inwardly disposed jacket surface of the inner ring 135 and is also provided there, on its inner face, with a circumferential toothing 144, in the manner of a ring gear of a planetary gear train, although the two sets of teeth 142, 144 differ slightly as to tooth count $Z_1$, $Z_2$, for example $Z_2=Z_1 \pm k$, $k=1, 2, 3$, etc., but $k<<Z_1$, $Z_2$.

Adjacent the upper face of the additional, toothed ring 143 is an upper, circular-disk-shaped housing part 145; in the same manner, adjacent the opposite end face or bottom face of the toothed inner ring 135 is a lower, circular-disk-shaped housing part 146. The two housing parts 145, 146 are approximately congruent and extend, radially speaking, from the outer circumference of the outer ring 136 inwardly to well inside of or beyond the sets of teeth 142, 144. Their inner sides can each be provided with a type of antifriction coating 47. This serves to guide the end faces 148 of a plurality of cantilever-mounted, toothed planet gears 149 in a plane-parallel manner, such that the longitudinal axes of said planet gears 149 are always oriented parallel to the rotational axis 138 of the slewing unit 130.

This plurality of planet gears 149—which are three in number in the present case—are maintained on their radial path by a sun gear 150, which is disposed concentrically with the rotational axis 138 inside the approximately cylindrical cavity bounded by the housing plates 145, 146. This sun gear can be guided, for example by means of bearings, particularly ball bearings 151, against the housing plates 145, 146 or in bushings 152, 153 fastened in the centers thereof.

The drive shaft 154 of a drive motor 155 is received rotationally fixedly in an opening 156 in the sun gear 150; preferably by means of a circumferential flange 157, the housing of the drive motor 155 is fixed, for example flanged, particularly by means of machine screws, to a housing plate 145, 146 or to a bushing 152, 153 fixed thereto.

Mutually aligned bores 158, 159 are used to connect the lower connection element 131 to a connection plate 120-123 of an assembly 102, 104, 106 and/or to connect the inner ring 135 to the lower housing plate 146; of these, the bores 158 of the inner ring 135 are configured as internally threaded blind bores, whereas the bores 159 in the housing plate 146 are configured as through-bores.

Mutually aligned bores 160, 161, 162 are used to connect the upper connection element 132 to a connection plate 120-123 of an assembly 102, 104, 106 and/or to connect the outer ring 136 to the additional ring 143 and to the upper housing plate 145; of these, the bores 160 of the outer ring 136 are configured as internally threaded blind bores, whereas the bores 161, 162 in the additional ring 143 and in the housing plate 145 are configured as through-bores.

The manner of operation of this arrangement is as follows.

When the run gear 150 rotates, driven by the drive motor 155, the planet gears 149 are constrained to roll between it and the toothing 144 of the additional ring 143, since said additional ring 143 is rotationally fixedly coupled via the upper housing plate 145 to the housing of the drive motor 155; thus, the sun gear rotates relative to the toothing 144 at the same rotation speed as the drive shaft 154 of the drive motor 155.

If one considers a coordinate system rotating synchronously with the center of a revolving planet gear 149, then: $n_{sun\ gear,1} = i_{12} = Z_1 : S_1$, where $i_{12}$ = the standard ratio, S = the tooth count of the sun gear and $Z_1$ = the tooth count of the toothing 144 on the additional ring 143.

Since the tooth count $Z_2$ of the toothing 142 on the inner ring 135 differs slightly from the tooth count $Z_1$ of the toothing 144 on the additional ring 142, $Z_1 \neq Z_2$, in the coordinate system under consideration the following relations apply:

$$n_{ring\ gear,1} = n_{sun\ gear} \cdot S/Z_1;$$

$$n_{ring\ gear,2} = n_{sun\ gear} \cdot S/Z_2 = n_{ring\ gear,1} \cdot Z_1/Z_2,$$

hence:

$$n_{ring\ gear,1}/n_{ring\ gear,2} = Z_2/Z_1 = (Z_1+k)/Z_1 = 1+k/Z_1.$$

Since $k/Z_1 \ll 1$, the two rotation speeds are nearly identical. If one now considers a coordinate system affixed to a housing part 145, 146, it follows that the rotation speed of the other housing part 146, 145 differs only insignificantly from zero, thus resulting in high rotation speed reduction and consequently high torque reduction; a relatively low-performance motor therefore suffices to adjust a large and heavy system part in this manner.

In addition, the motor 155 can be disposed inside a tubular middle part 117-119 and thus effectively protected against external influences.

Figure 15:
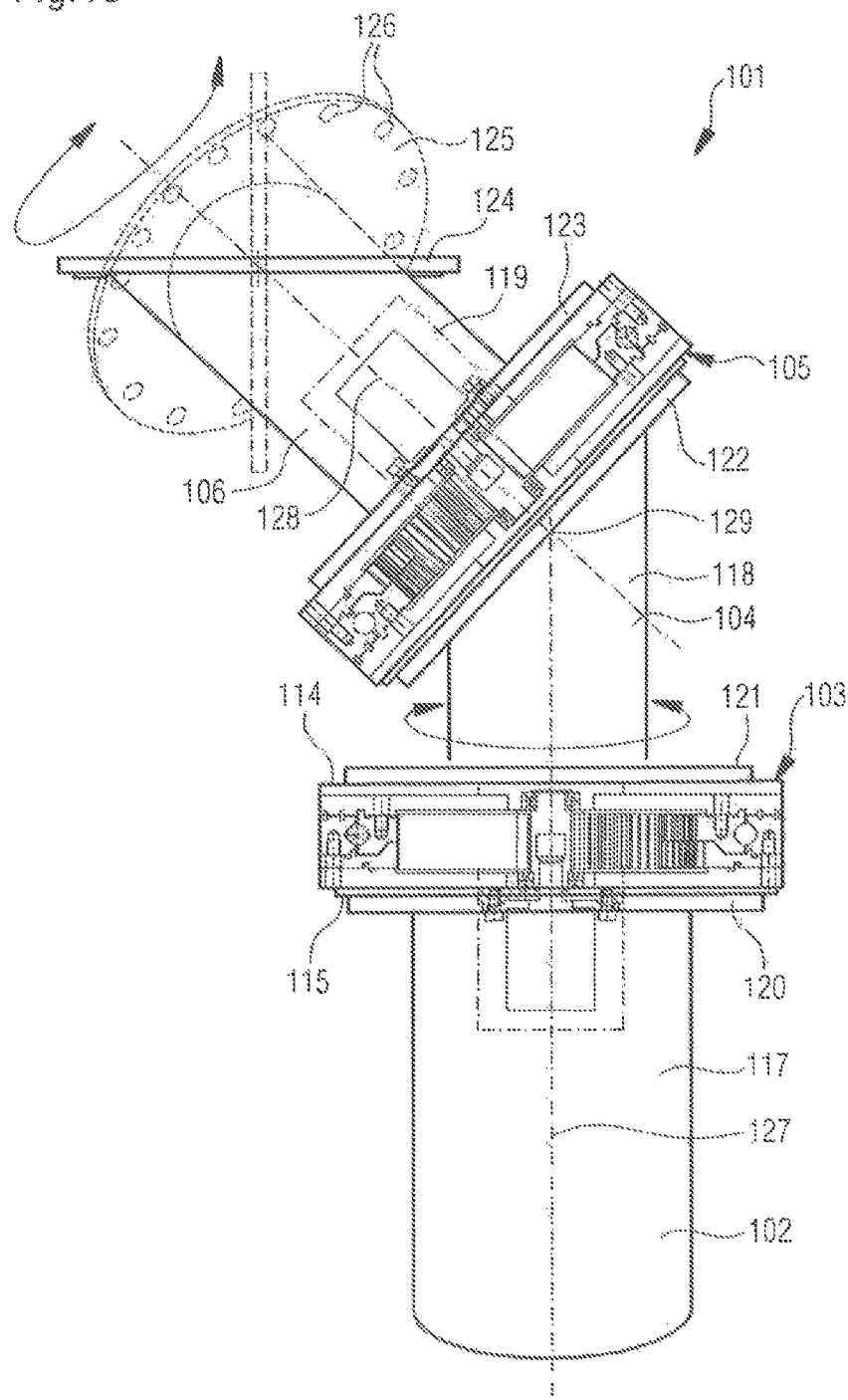
FIG. 15 is an illustration corresponding to FIG. 12 in which each of the slewing units is sectioned along its vertical main plane.

FIG. 15 shows a tracking device 101 according to the invention in use as an adjustable supporting construction for a planar frame for mounting one or preferably a plurality of solar modules, the frame and solar modules having been omitted from the drawing for the sake of clarity. Particularly apparent is the Wolfrom gear system integrated into the two slewing units 103, 105 and the motors 155 driving said gear system. It can be seen that the drive motors 155 are preferably received in the base 102, on the one hand, and in the upholding assembly 106, on the other hand, specifically each concentrically with the respective pivot axis 127, 128. Whereas the housing of the lower motor 155 does not move at all as a result, thus allowing the electrical contacting to be performed in the simplest manner, the housing of the upper motor 155 does pivot along with the upper pivot axis 128. However, this is not a problem for use with a solar array: such constructions never execute more than one complete rotation, since, during the night, solar arrays of this kind are moved back to their morning starting position. Consequently, even loose wiring of the upper motor 155 is possible.

Additional modifications of the invention are possible; for instance, a slew drive of a tracking system that is itself a dual-axis system can be inhibited or locked to create a single-axis tracking system, which naturally requires less control energy. On cloudy days, for example, the elevation control could thus be set to a moderate, optimized value and then turned off to save energy. In addition, two slew drives could be disposed together in a common housing, or a skirt, for example in the form of a skullcap-shaped half-shell, disposed on the upper slew drive or even on the support structure 12, could protect both slew drives together against rain or other weather conditions.

| | List of Reference Numerals |
|---|---|
| 1 | Tracking device |
| 2 | Solar collector |
| 3 | Foot element |
| 6 | Substructure |
| 6' | Part |
| 6'' | Part |
| 6''' | Substructure |
| 10 | Slewing unit |
| 12 | Receiving structure |
| 13 | Support structure |
| 14 | Mounting device |
| 15 | Drive |
| 16 | Lighting system |
| 17 | Coupling device |
| 18 | Fastening device |
| 19 | First connection element |
| 20 | Vehicle |
| 21 | Second connection element |
| 22 | Chamber |
| 23 | Hinge |
| 24 | Screw connection |
| 25 | Flange |
| 26 | Hinge member |
| 27 | Securing screw |
| 28 | Bolt |
| 30 | Fastening element |
| 31 | Pushrod |
| 31' | Linkage |
| 31'' | Hinge |
| 32 | Foot rail |
| 101 | Device |
| 102 | Base |
| 103 | Lower slewing unit |
| 104 | Mounting assembly |
| 105 | Upper slewing unit |
| 106 | Upholding assembly |
| 107 | Housing |
| 108 | Cylinder-jacket-shaped part |
| 109 | Circular-disk-shaped part |
| 110 | Housing extension |
| 111 | Surface region |
| 112 | End face |
| 113 | Protrusion |

-continued

| List of Reference Numerals | |
|---|---|
| 114 | Connection surface |
| 115 | Connection surface |
| 116 | Fastening bore |
| 117 | Middle part |
| 118 | Middle part |
| 119 | Middle part |
| 120 | Connection plate |
| 121 | Connection plate |
| 122 | Connection plate |
| 123 | Connection plate |
| 124 | Connection plate |
| 125 | Fastening flange |
| 126 | Fastening bore |
| 127 | Pivot axis |
| 128 | Pivot axis |
| 129 | Intersection point |
| 130 | Slewing unit |
| 131 | Connection element |
| 132 | Connection element |
| 133 | Connection surface |
| 134 | Connection surface |
| 135 | Ring |
| 136 | Ring |
| 137 | Gap |
| 138 | Pivot axis |
| 139 | Rolling element |
| 140 | Raceway |
| 141 | Raceway |
| 142 | Toothing |
| 143 | Additional ring |
| 144 | Toothing |
| 145 | Housing part |
| 146 | Housing part |
| 147 | Antifriction coating |
| 148 | End face |
| 140 | Planet gear |
| 150 | Sun gear |
| 151 | Ball bearing |
| 152 | Bushing |
| 153 | Bushing |
| 154 | Drive shaft |
| 155 | Drive motor |
| 156 | Opening |
| 157 | Flange |
| 158 | Bore |
| 159 | Bore |
| 160 | Bore |
| 161 | Bore |
| 162 | Bore |
| IA | Illuminated Area [AE] |
| W | Width [B] |
| H | Height [H] |
| MA | Main pivot Axis [HA] |
| MS | Geometric Center [MS] |
| TE | Top Edge [OK] |
| D | Depth [T] |
| SA | Shadow area [VB] |
| X | Connecting line |
| $X_v$ | Geometric center |

The invention claimed is:

1. A tracking device (1; 101) comprising at least one receiving structure (12) which can be adjusted about at least one axis, for mounting at least one element that is sensitive to electromagnetic waves and has an optical or radiation direction, and comprising at least one rotational drive per axis for the purpose of actively rotationally adjusting the receiving structure (12) in order for the at least one element mounted thereon to track a celestial body, on one or more axes, wherein the at least one rotational drive comprises an open-center slewing unit with a respective two mutually concentric, annular connection elements (19, 21; 131, 132) that are mounted one against the other and are coupled to at least one motor (15; 155) for mutual relative adjustment, wherein a first connection element (19, 21; 131, 132) comprises at least one planar connection surface for stationary fixing to a foundation, base, upright or a connection element of another slewing unit, and wherein a second connection element (19, 21; 131, 132) comprises at least one planar connection surface (133, 134) for rotationally fixed coupling to the receiving structure (12) or to a connection element of another slewing unit, wherein, further, provided between the mutually concentric, annular connection elements (19, 21; 131, 132) of a slewing unit is at least one row of rolling elements (139) that roll along raceways (140, 141) on the first and second connection elements (19, 21; 131, 132), characterized in that
 a) provided on one connection element (19, 21; 131, 132) is an at least partially circumferential toothing (142) that is formed, together with the raceway(s) (140) there, by machining or shaping a shared annular base body, wherein
 b) provided on the other connection element (19, 21; 131, 132) are coronally distributed bores (160) that serve to effect attachment to a system part and that are formed, together with the raceway(s) (141) there, by machining or shaping a shared annular base body,
 c) wherein the slewing unit is coupled to a second slewing unit such that their rotational axes (127, 128), about which their respective two annular connection elements rotate relative to each other, never, in any possible rotational position of the tracking device (1; 101), extend perpendicular or parallel to each other, but always at an oblique angle to each other,
 d) and wherein one annular structure of each of the two slewing units (103, 105) is connected to a shared mounting assembly (104), while the respective other annular structure is coupled to the system part to be adjusted, on the one side, and to a foundation, chassis or a second system part, on the other side, wherein the shared mounting assembly (104) between two slewing units (103, 105) is configured such that the two pivot axes (127, 128) extend neither parallel to each other nor perpendicular to each other.

2. The tracking device (1; 101) as in claim 1, characterized in that the slewing unit or the second slewing unit is arranged such that its rotational axis, about which its two annular connection elements rotate relative to each other, is never, in any possible rotational position of the tracking device (1), oriented perpendicular or parallel to the preferential optical or radiation direction of the radiation-sensitive elements mounted on the adjustable receiving structure (12), but is always at an oblique angle to said direction.

3. The tracking device (1; 101) as in claim 1, characterized in that the shared mounting assembly (104) is configured such that at least one annular structure of at least one of the two slewing units (103, 105) embraces both pivot axes (127, 128) with a clearance on all sides.

4. The tracking device (1; 101) as in claim 1, characterized in that the two rotational axes (127, 128) intersect with each other, or intersect with each other in the region of the shared mounting assembly (104), or inside a connection part (121, 122) thereof.

5. The tracking device (1; 101) as in claim 4, characterized in that the two rotational axes (127, 128) intersect each other, and, away from a common intersection point (129), one rotational axis tends upwardly, on the one side, and the other rotational axis tends downwardly, on the other side, wherein an inclination angle (α) between the two rotational axes (127, 128) intersecting each other is an obtuse angle.

6. The tracking device (1; 101) as in claim 5, characterized in that at the intersection point (129), the rotational axes (127, 128) can be extended beyond the intersection point (129) such that two legs that are projected toward each other of the two, if necessary extended, rotational axes (127, 128) border an inclination angle (β) that is equal to 15° or more, preferably equal to 30° or more, particularly equal to 45° or more, and/or is equal to 75° or less, preferably equal to 60° or less, particularly equal to 45° or less.

7. The tracking device (1; 101) as in claim 1 characterized in that the shared mounting assembly (104) comprises one or two flat, or planar, connection part(s) (121, 122), the connection of a flat connection part (121, 122) to one or both slewing units (103, 105) being effected by a form-fit or a force-fit, or by screwing them together.

8. The tracking device (1; 101) as in claim 1, characterized in that the shared mounting assembly (104, 163) comprises at least one elongated profile (118) having an at least locally constant cross section, or at least one rectilinearly extending, elongated profile (118) having an at least locally constant cross section, or at least one flat bar, or at least one angle iron, or at least one T-bar, or at least one hollow profile (118), or at least one straight tube, or at least one straight, cylindrical tube, or at least one straight, circular-cylindrical tube.

9. The tracking device (1; 101) as in claim 8, characterized in that one or both end faces of the profile (118) each lie in a respective plane, wherein a plane in which a first end face of the profile (118) lies is intersected perpendicularly by the longitudinal axis of the tube, and wherein a different plane in which a second end face of the profile (118) lies is not intersected perpendicularly by the longitudinal axis of the tube.

10. The tracking device (1; 101) as in claim 9, characterized in that a respective fastening plate (121, 122) is fixed to one or each end face of the profile (118), resting flush against the particular end face, wherein at least one fastening plate (121, 122) has a respective plurality of fastening bores (126) arranged so as to surround the particular profile (118) coronally with a clearance on all sides, and is flanged to an annular structure of a slewing unit (103, 105) by means of a respective plurality of screws engaging through the fastening bores (126).

11. The tracking device (1; 101) as in claim 1, characterized in that at least one pinion and/or at least one worm gear meshes with said at least partially circumferential toothing.

12. The tracking device (1; 101) as in claim 11, characterized in that at least one pinion or at least one worm gear is coupled to a braking and/or detent device.

13. The tracking device (1; 101) as in claim 11, characterized in that the toothing is located on the outer circumference of the outer, annular structure of the particular slewing unit, or on the inner circumference of the inner, annular structure (135) of the particular slewing unit (130).

14. The tracking device (1; 101) as in claim 13, characterized in that pinions or gears meshing with the toothing (142, 144) are disposed, or guided or bearing-mounted, inside the housing (145, 146) of the particular slewing unit (130).

15. The tracking device (1; 101) as in claim 14, characterized in that one or more gears meshing with the toothing (142, 144) are elements or planet gears (149) of a planetary gear train, wherein (i) the toothing (142, 144) assumes the function of the ring gear of the planetary gear train, and/or wherein (ii) said planetary gear train is constituted in the manner of a Wolfrom gear train, with a ring gear (135, 143) that is split along a main plane and whose parts (135, 143) have slightly different tooth counts ($Z_1$, $Z_2$).

16. The tracking device (1; 101) as in claim 1, characterized in that the connection surfaces of a connection element (21) are each connected via a respective tube (13) or linkage to one or more receiving structures (12).

17. The tracking device (1; 101) as in claim 1, characterized in that a plurality of support structures are coupled to one another or are coupled to one another via a linkage or via a shared connection element of a slewing unit (10) for purposes of joint synchronous pivoting movement.

18. The tracking device (1; 101) as in claim 1, characterized in that a connection element (19) is anchored to an adjacent structure by means of a multiplicity of fastening screws screwed into fastening bores distributed coronally about the particular rotational axis.

19. The tracking device (1; 101) as in claim 18, characterized in that an adjacent structure comprises an annular mounting plate that is intersected perpendicularly by the particular rotational axis (27, 28).

20. The tracking device (1; 101) as in claim 19, characterized in that the mounting plate is connected to at least one bottom-side fastening element for mounting to a foundation, chassis, frame, stand, tripod, pylon or column (6).

21. The tracking device (1; 101) as in claim 20, characterized in that the fastening element has at least one planar, horizontal bottom side, and/or at least one horizontal fastening plate or fastening rail (32).

22. The tracking device (1; 101) as in claim 21, characterized in that the mounting plate is connected to at least one fastening plate or fastening rail (32) by one or two or more connecting and/or stiffening elements, each having at least one edge that extends slantingly backwards from the mounting plate to the fastening plate or fastening rail (32).

23. The tracking device (1; 101) as in claim 1, characterized in that a slewing unit (10) and/or a bearing carrying the support structure (13) is a distance (H) away from the surface beneath it that is equal to or greater than half the extent (T) of a support structure (13) transversely to the rotational axis (27, 28) thereof, thus leaving space beneath for another type of use.

24. The tracking device (1; 101) as in claim 1, characterized in that inside the base is a cavity through which lines can be run from a foundation to the receiving structure.

25. The tracking device (1; 101) as in claim 24, characterized in that the connection of the motor(s) of the slew drive(s) to a power source is effected inside the base.

26. The tracking device (1; 101) as in claim 24, characterized in that the lead-out of at least one signal supplied by the radiation-sensitive element(s) is effected inside the base.

27. The tracking device (1; 101) as in claim 26, characterized in that the connection of a signal supplied by the radiation-sensitive element(s) to a feed line, or to a feed line laid underground, is effected inside the base.

28. The tracking device (1; 101) as in claim 26, characterized in that the storage of a signal supplied by the radiation-sensitive element(s) is effected inside the base.

29. The tracking device (1; 101) as in claim 26, characterized in that a device for coupling a signal supplied and/or stored by the radiation-sensitive element(s) to a load, or to a mobile load, is provided on the base.

30. The tracking device (1; 101) as in claim 1, characterized in that the main surfaces of all the solar collectors or solar reflectors (2) mounted on a shared receiving structure (12) are implemented as planar and lie in a common, adjustable plane.

31. A tracking device (1; 101) comprising at least one receiving structure (12) which can be adjusted about one axis, for mounting at least one element that is sensitive to electromagnetic waves and has an optical or radiation direction, and comprising at least one rotational drive on the one axis for the purpose of actively rotationally adjusting the receiving structure (12) in order for the at least one element mounted thereon to track a celestial body, on one axis, wherein the at least one rotational drive comprises an open-center slewing unit with a respective two mutually concentric, annular connection elements (19, 21; 131, 132) that are mounted one against the other and are coupled to at least one motor (15; 155) for mutual relative adjustment, wherein a first connection element (19, 21; 131, 132) comprises at least one planar connection surface for stationary fixing to a foundation, base or upright, and wherein a second connection element (19, 21; 131, 132) comprises at least one planar connection surface (133, 134) for rotationally fixed coupling to the receiving structure (12), wherein, further, provided between the mutually concentric, annular connection elements (19, 21; 131, 132) of a slewing unit is at least one row of rolling elements (139) that roll along raceways (140, 141) on the first and second connection elements (19, 21; 131, 132), characterized in that a) provided on one connection element (19, 21; 131, 132) is an at least partially circumferential toothing (142) that is formed, together with the raceway(s) (140) there, by machining or shaping a shared annular base body, wherein b) provided on the other connection element (19, 21; 131, 132) are coronally distributed bores (160) that serve to effect attachment to a system part and that are formed, together with the raceway(s) (141) there, by machining or shaping a shared annular base body, c) wherein the foundation, base or upright is embodied as a first column (6) which is shifted all the way to an edge of a solar panel surface of all solar panels mounted on the receiving structure (12), d) and wherein a second column (6) is provided to give reliable support and is located diametrically opposite the first column (6) with respect to the center of the solar panel surface, but also on the main axis (HA) to mount the support structure (13) is bearing-mounted a second time, e) and wherein the support structure (13) which constantly orients itself along the main axis (HA), is directly screwed to the concentric element of the slewing unit (10) which has the smaller diameter.

* * * * *